United States Patent [19]
Harper et al.

[11] Patent Number: 5,892,907
[45] Date of Patent: Apr. 6, 1999

[54] BYPASS SEND AND RECEIVE OPTIMIZER METHOD FOR VTAM PROCESSES

[75] Inventors: Thomas A. Harper, Sugar Land; Valdemar Garza, Jr., Houston, both of Tex.; Philip R. Mead, Los Angeles, Calif.

[73] Assignee: BMC Software, Inc., Houston, Tex.

[21] Appl. No.: 225,158

[22] Filed: Apr. 8, 1994

Related U.S. Application Data

[62] Division of Ser. No. 830,435, Jan. 30, 1992, Pat. No. 5,432,901.

[51] Int. Cl.$^6$ ........................................ G06F 13/00
[52] U.S. Cl. ............................................. 395/200.3
[58] Field of Search ...................... 364/DIG. 1 MS File, 364/DIG. 2 MS File; 395/375, 200, 250, 275, 325, 600, 800, 200.3

[56] References Cited

U.S. PATENT DOCUMENTS

| | | | |
|---|---|---|---|
| 4,750,137 | 6/1988 | Harper et al. | 364/514 |
| 4,837,679 | 6/1989 | Wiles, Jr. et al. | 364/200 |
| 4,893,307 | 1/1990 | McKay et al. | 370/94.1 |
| 4,937,739 | 6/1990 | Ernst et al. | 364/200 |
| 5,005,137 | 4/1991 | Ernst | 364/514 |

OTHER PUBLICATIONS

Landgraf, Alane, "VTAM Express; A New Approach to Terminal Data Stream Compression," Enterprise Systems Journal, Jan. 1991 (page No. unknown).

SofTouch Systems, Inc., Oklahoma City, OK, "VTAM–Express Release 2.0" (various literature pieces, date unknown).

IBM, "VTAM Version 3 Releases 1 and 1.1 Programming," SC23–0015–2, File No. S370/4300/30XX–50, third edition Jul. 1986, pp. i–xxxiv and 1–38.

IBM, "3270 Information Display System, Data Stream Programmer's Reference," GA23–0059–06, 1981 & 1991, pp. 5–21 through 5–23, 5–46, 5–47.

IBM manual chapter, "Local Format Storage," pp. 16–1 through 16–12 (date unknown).

Stacy et al., "System for Enhancing Data Transfer Between Application Programs and Communications Programs in Telecommunications Systems," Serial No. 07/557,339, filed Sep. 4, 1990.

*Primary Examiner*—Robert B. Harrell
*Attorney, Agent, or Firm*—Arnold, White & Durkee

[57] ABSTRACT

Under VTAM, or similar-type data communications system, co-executing "partner" processes typically exchange data via SEND and RECEIVE requests that are processed by VTAM. A method in accordance with the invention provides a way for optimizing this data exchange process. The optimized method bypasses VTAM to provide significant savings of system resources and improved execution speed over that required for VTAM to process the same SEND and RECEIVE requests.

3 Claims, 11 Drawing Sheets

VTAM REQUEST UNIT (RU) STRUCTURES

EXAMPLE:    OIC

EXAMPLE:    FIC       LIC

EXAMPLE:    FIC       MIC    ...    MIC       LIC

LEGEND

OIC:   ONLY IN CHAIN

FIC:   FIRST IN CHAIN

MIC:   MIDDLE IN CHAIN

LIC:   LAST IN CHAIN

FIG. 5
(PRIOR ART)

BYPASS SEND AND RECEIVE OPTIMIZER METHOD FOR VTAM PROCESSES

This application is a divisional of Ser. No 07/830,435, filed Jan. 30, 1992, now U.S. Pat. No. 5,432,901, issued Jul. 11, 1995.

BACKGROUND OF THE INVENTION

This invention relates to a mapping-type optimization system for reducing computer-network data traffic between (1) an arbitrary host unit, such as a VTAM application program, which issues SEND- and RECEIVE-type instructions to a communications manager such as VTAM; and a peripheral unit such as a remote terminal. In part, the invention represents an advantageous generalization of mapping-type optimization systems taught in U.S. Pat. Nos. 4,750,137; 4,837,679; 4,937,739; 5,005,137; and 5,046,025. all assigned to the assignee of this application.

Program Operation in the VTAM Environment

VTAM (Virtual Telecommunications Access Method) is a collection of computer program routines and macros that facilitate Systems Network Architecture (SNA) communications. VTAM is distributed by IBM and widely used on IBM-type mainframe computers. VTAM is described in detail in, among other places, the publication "Advanced Communications Functions for VTAM," published by IBM under its catalog number SC23-0015 (updated periodically; hereinafter referred to as the VTAM Manual). Some of the pertinent functions of VTAM are summarized herein, but it is assumed that those of ordinary skill having the benefit of this disclosure will be familiar with the VTAM Manual or with the information set forth therein.

Nature of VTAM. Referring to FIG. 1B, VTAM provides callable communication services to application programs that have been designed to make use of such services. Such application programs are commonly referred to as "VTAM applications" and sometimes as "APPLS" (pronounced apples) or colloquially "APPLIDS" (apple-eye-dees). A VTAM application generally comprises two portion, the processing portion and the communications portion.

The processing portion of a VTAM application is largely arbitrary. It performs whatever processing (e.g., database manipulation) is desired by the application designer. It can normally be written in any convenient computer language for which a compiler, interpreter, etc., is available.

The communications portion, normally written in assembly language, handles the application's interface with VTAM and thus with the computer system's communications facilities. The communications portion takes care of:

(1) establishing itself as a VTAM application, i.e., registering with VTAM as a user of VTAM's communications services, usually by issuing macro instructions such as OPEN to VTAM as discussed in more detail below;

(2) handling requests from other logical units, conveyed by VTAM, to establish a communications session with the application program;

(3) sending information to, and receiving information from, other logical units via VTAM's communications services, normally by issuing macro instructions such as SEND and RECEIVE to VTAM; and (4) when necessary, de-establishing itself as a VTAM application, normally by issuing macro instructions such as CLOSE to VTAM.

A greatly simplified representation of typical data flows in a SEND request issued by a VTAM application is depicted in FIGS. 1A and 1B. The syntax and other conventions by which the communications portion of an application program interfaces with VTAM is sometimes referred to as the "VTAM application program interface (API)."

As seen in FIG. 1B, in step (a) the application APPL writes outgoing data to be sent to, e.g., a terminal to a buffer. In step (b), the APPL issues a SEND macro instruction to VTAM; in step (c), VTAM retrieves the outgoing data, and in step (d) VTAM sends the outgoing data to the terminal.

Public Library Closed-Stacks Analogy. For purposes of illustration, an analogy to a public library is used below and depicted in FIG. 2. Many public libraries have at least some closed-stack reserved book areas that are accessible only to library staff. Patrons wishing to get books, magazines, etc., from such an area typically must fill out request slips and turn them in to a staff member (referred to here as a "dispatcher") at a service desk located in a publicly accessible area. The dispatcher collects the request slips and passes them, either immediately or periodically in a batch, to other library staff members working in the closed stacks (referred to here as "researchers").

The dispatcher at the service desk is analogous to VTAM, in that he or she serves as an intermediary, a communications interface, between the library's closed-stack researchers and the library's patrons. The researchers working in the closed stacks are analogous to VTAM applications, because they deal with library patrons only via the dispatcher at the service desk.

The above analogy will be referred to from time to time in the discussions below. It must be understood, of course, that the analogy is only a rough one and is presented solely as an aid to understanding.

Issuance and Completion of VTAM Macro Instructions. As is well-known in the art, generally speaking VTAM applications request communication services from VTAM by:

(i) specifying just what service is desired, as well as additional control information, in one or more addressable storage "message boards" that are accessible to both the VTAM application and VTAM itself, and (ii) passing control to a special routine in VTAM itself that, among other things, goes and looks on the message board(s) to determine what action should be taken.

At some point in its processing of the service request, VTAM returns control to the VTAM application. In doing so, it likewise "leaves a note" for the application in one or more message boards to indicate the status of the request processing.

Depending on the nature of the service request, control may be returned to the VTAM application upon completion by VTAM of all steps necessary to process the service request. This is commonly referred to as "synchronous" processing.

Alternatively, control may be returned to the VTAM application earlier than such completion, and generally as soon as VTAM has accepted the request for processing. This is commonly referred to as "asynchronous" processing. The VTAM application and VTAM itself each continue execution more or less in parallel as determined by the operating system of the computer system in question. VTAM reports completion of the service request by leaving a note to that effect for the VTAM application, then passing control to a special routine in the application.

In the library analogy, a closed-stacks researcher may leave a message to the dispatcher on the library staff message board, asking the dispatcher to give certain books to a library patron, and then call out the dispatcher's name to let the dispatcher know that there is work to be done. The dispatcher reads the message, complies with the request, and leaves a return note on the message board, addressed to the researcher, reporting that completion.

In synchronous processing, the researcher would not go back to work until he read the dispatcher's completion report on the message board. On the other hand, in asynchronous processing the researcher would go back to work as soon as he saw the dispatcher read the service-request message on the message board. The researcher would go back to the message board to read the dispatcher's completion report only when his (the researcher's) own name was called for that purpose.

Request Parameter List (RPL) "Message Board". Many kinds of VTAM macro instructions must indicate the address of a "request parameter list" or RPL. The RPL operates as a message board of the kind described above. Its format is described in detail in the VTAM Manual; and its operation can usefully be explained through the library analogy.

Suppose that a closed-stack researcher John Doe (analogous to a VTAM application program) retrieves several bulky books, several pages of which are to be photocopied and delivered to library patron Jane Roe (analogous to a logical unit LU). Further suppose that researcher Doe will not carry these books to the photocopy service area himself, but instead wants the dispatcher (analogous to VTAM) to do so and also to deliver the copies to patron Roe.

John Doe writes out these instructions for the dispatcher, including the fact that the photocopies are to be delivered to patron Jane Roe. Instead of attempting to deliver the specific instructions directly to the dispatcher, John Doe leaves the instructions in, say, pigeonhole number 432 shown in FIG. 2. He then writes a separate, very short note on the library staff message board saying only that there is photocopy work to be done, and that more detailed instructions are located in basket number 432. These more detailed instructions (i.e., control information) and the numbered basket are analogous to an RPL and its address.

John Doe calls the dispatcher's name to get his attention and points at the message board; the dispatcher, perhaps operating in accordance with a priority scheme of some sort, eventually retrieves the detailed instructions from pigeonhole number 432. This frees up researcher John Doe to go back to work if he so desires (thus an example of asynchronous processing; as noted above, John Doe may instead elect to wait around for the dispatcher to report completion of the task, referred to as synchronous processing).

Normal OPEN Processing by VTAM

As alluded to above, a VTAM application commonly establishes itself as a user of VTAM's communication services by issuing macro instructions such as OPEN. An OPEN instruction is analogous to closed-stack researcher John Doe announcing his arrival for work at the beginning of a shift.

The OPEN instruction specifies certain things to VTAM so that VTAM knows what to do in specific situations. This is analogous to the closed-stack researcher John Doe locating an empty desk and signing in on a chart indicating that he will be working at that particular desk today. This sign-in procedure permits the dispatcher to determine where requests that are to be passed specifically to John Doe should be routed.

As shown in simplified form in FIG. 3, in the same vein the VTAM application constructs an access method control block (ACB) and an exit list (EXLST) in addressable storage (step (a)). The formats of these two control blocks are described in detail in the VTAM Manual and are briefly described below.

The access method control block ACB constructed by the VTAM application is an area of addressable storage that is used by both VTAM and the application. The ACB conforms to the conventional VTAM format; that is, the order and type of data in the ACB storage area conforms to a set of rules so that both the application and VTAM can identify and access the ACB data, which are used primarily to identify the application to VTAM. The ACB includes a pointer to the exit list EXLST, shown in FIG. 3 as A(EXLST).

In the library analogy, the ACB corresponds roughly to the part of the researcher sign-in chart that identifies the desk at which researcher John Doe will be working during his shift.

As illustrated in FIG. 3, the exit list EXLST serves as a "card catalog" containing the locations of procedures to be performed upon the occurrence of specified events. The exit list EXLST is an area of addressable storage that contains the names of (or addresses other pointers or references to) any "user exit points" previously established by the application. These are shown in FIG. 3 as A(ATTN), . . . A(TPEND). Each user exit point is a program (routine) to which control should be passed by VTAM upon the occurrence of a specified event. For example, in all likelihood the application will include a routine to be given control upon the occurrence of a request to establish a session by an end user at a terminals. The exit list EXLST for such an application would normally contain a reference to a LOGON exit to which control should be passed upon such an occurrence.

In the library analogy, suppose that the closed-stack researcher John Doe is, among other things, conducting an end-user survey to help determine how the library's Russian literature collection might be improved. Toward that end, he wishes to make photocopies of all Russian-literature request slips submitted by library patrons for his later use in this project, and has left detailed instructions with the library's photocopying staff in this regard.

When John Doe signs in for a shift, he might specify, in a special block of the sign-in chart, that whenever the dispatcher desires to route a request slip to him that involves Russian literature, he (the dispatcher) should send the request slip to the photocopying service area to be copied. Clearly, John Doe need not write out, in his space on the sign-in chart, the detailed instructions that he has already left with the photocopying staff; he need only indicate in that space that certain request slips are to be photocopied in the photocopy service area in accordance with the procedures that he has already specified in that area.

This special block on the library sign-in chart thus contains a "pointer" to the photocopying service instructions desired by John Doe upon the routing of a Russian-literature request slip to him. This block is analogous to an application program's exit list EXLST, which includes pointers to user exit routines to which control is to be passed by VTAM upon the occurrence of specified events.

Establishment of VTAM Sessions by APPLs

After a VTAM application program has successfully signed in for work, so to speak, with VTAM, the application can establish one or more work sessions (usually referred to simply as "sessions") with end users of, e.g., terminal equipment or with other VTAM applications (any of which is conventionally referred to as a "logical unit" or LU).

As illustrated in FIG. 4, the session-establishment process normally begins when a logical unit LU (shown in FIG. 4 as USER) sends a formatted signal to VTAM requesting that a session be established with a particular VTAM application (step (a), shown in FIG. 4 as LOGON REQUEST). If the VTAM application in question has signed in for work as described above, then VTAM "drives" the appropriate exit for that application. That is, VTAM passes control to the application's routine specified in the exit list EXLST (e.g., the LOGON exit routine) if any. This exit routine typically collects information about the session being established (referred to as a "pending" session until it is established) and returns control to VTAM. VTAM is thus freed up to process other exit routines, while the application can proceed with setting up formatted data storage areas, specific to the pending session, in accordance with VTAM conventions, and to perform other session-preparation work.

Among the formatted areas set up by the VTAM application in preparation for a new session is a "node initialization block" NIB. The NIB contains information to identify and define the session. It may contain a pointer to a special exit list EXLST, the exit routines of which override certain exit routines specified in the access method control block ACB as described above for the particular session. The node initialization block NIB also specifies the initial CONTINUE mode (ANY or SPECIFIC) for the session, explained in more detail in Section 1.4(e) below.

Eventually, assuming that the VTAM application is willing to establish the requested work session, the VTAM application advises VTAM that it has completed its session-establishment preparations, and that it is ready to begin the requested work session. It does so by issuing to VTAM an OPNDST (open destination) macro instruction. This macro instruction is accompanied by a pointer to a request parameter list RPL, which contains the address of the node initialization block to be used for the new session as well as other control information pertinent to the specific VTAM service desired by the application (in this case, completing a session-establishment request), e.g., a BIND argument and associated data relating to the proposed session.

VTAM processes the OPNDST macro instruction in part by assigning a unique communications identifier or "CID" to the session being established. The CID is VTAM's method of "tagging" each session for identification; it is used by VTAM as an index into a lookup table of session-information storage areas. VTAM informs the VTAM application of the CID by copying it to the CID field of the node initialization block NIB and/or to the ARG field of the request parameter list RPL, depending on the specific circumstance, as described in the VTAM Manual. The VTAM application thereafter uses the CID to identify the specific session in requesting services from VTAM.

Sending and Receiving Data via VTAM

After a session has been established between an end-user (a logical unit LU) and a VTAM application, the application can send data to or receive data from the LU, in either case doing so via VTAM's communications services. These services may be invoked by the application through the issuance of a SEND or RECEIVE macro instruction to VTAM. These macro instructions ("requests" for data transfers) may refer to (i) control information, specified by the application in the request parameter list RPL as described in Section 1.1(d) above; and optionally may refer to (ii) data to be transferred, normally stored in the VTAM application's addressable storage area.

Chains of Request/Response Units (RUs). Data is normally transferred between the application and VTAM in pieces no larger than a specified size. Each piece is referred to as a "request/response unit" or RU. The specified size of the RU is referred to as the RUSIZE and is normally determined by system programmers who operate and maintain the particular computer system in question. In many if not most systems, the RUSIZEs for incoming and outgoing data may be different.

If a VTAM application must transfer data larger than the RUSIZE, and the particular VTAM environment does not support the Large Message Performance Enhancement Outbound (LMPEO) RPL operand, then the APPL must first break the data stream into a chain of smaller request units or RUs. When the RUs in a chain are more than two in number, they are referred to respectively as first in chain (FIC), zero or more middle in chains (MIC), and last in chain (LIC). Depending on the amount of data to be transmitted, a chain may include only one RU (only-in-chain or OIC); a two-RU chain does not have a middle in chain RU. Several examples of RU chains are shown in FIG. 5.

SEND Requests from a VTAM Application. A SEND request is a request issued to VTAM by a VTAM application that wishes to transmit data and/or control information to a logical unit LU. The general flow of data and control information for a SEND request is illustrated in FIG. 6.

The VTAM application can specify, by including a RESPOND operand in the request parameter list RPL for the SEND request, whether and how the receiving LU should report back the successful or unsuccessful receipt and processing of that SEND request. A "definite response requested" notation in the RPL indicates that the receiving LU should report either successful receipt and processing (referred to as a "positive response") or unsuccessful receipt and processing (referred to as a "negative response"). An "exception response requested" notation in the RPL indicates that the receiving LU should report back only unsuccessful receipt and processing, i.e., only negative responses are desired.

SEND-request sequence numbers are assigned by VTAM (in the case of normal-flow requests) or by the VTAM application (in the case of expedited-flow requests). These sequence numbers help VTAM and/or the application correlate a receiving LU's success/no-success response with the SEND instruction that requested such a response.

Because VTAM acts as an intermediary between the sending VTAM application and the receiving logical unit LU, the VTAM application does not become aware of the LU's success/no-success response to the SEND request until notified by VTAM. In issuing a SEND request, the VTAM application can specify in the request parameter list RPL just how and when it is to be so notified. The RPL operand POST=RESP indicates to VTAM that the VTAM application wants to wait until this response is received before continuing its own execution. (In this case, the LU's response is copied by VTAM to the RPL, where it may be accessed by the VTAM application.) Alternatively, the RPL operand POST=SCHED indicates to VTAM that the VTAM application does not want to wait for the receiving LU's success/no-success response, and accordingly that VTAM is to notify the VTAM application as soon as VTAM has accepted the SEND request so that the VTAM application can proceed with its own execution.

RECEIVE Requests from a VTAM Application. A RECEIVE request is a request issued to VTAM by a VTAM application that is ready and wishes to receive data and/or control information from a logical unit LU. Each RECEIVE request includes a pointer to a request parameter list RPL, in which additional control information can be specified by the VTAM application. A VTAM application can have numerous RECEIVE requests pending simultaneously.

As shown in simplified form in FIG. 7 and in somewhat more detail in FIG. 8, VTAM collects RECEIVE requests from VTAM applications (shown as APPL in the figures). It also collects data from one or more users (e.g., terminal operators) or other logical units LU.

RECEIVE ANY vs. RECEIVE SPEC(ific). A VTAM application frequently has multiple sessions on-going at any given time, each session being identified by a CID as explained in Section 1.3. The application may wish to issue a RECEIVE request that is, or alternatively that is not, specific to any particular session.

FIGS. 7 and 8 show in simplified form the general flow of data and control information for a RECEIVE request. By specifying the operation code ANY in the request parameter list RPL for the RECEIVE request in question (OPTCD=ANY), the VTAM application can indicate to VTAM that VTAM can complete that RECEIVE request by giving the application incoming data intended for any session. Alternatively, the VTAM application can use the operation code SPEC (for specific) to indicate to VTAM that only data intended for a specified session can be used to complete that particular RECEIVE request.

CONTINUE ANY vs. CONTINUE SPEC(ific). Suppose that a VTAM application issues several RECEIVE ANY requests, and that soon thereafter VTAM completes one of these requests with a query from an end user operating a terminal (the terminal thus functioning as a logical unit LU, of course). Receipt of the query may touch off a conversation between a subroutine of the VTAM application and the end user LU. The subroutine might be one that is designed to handle the specific type of query send by the end user.

Such a conversation between the VTAM application's subroutine and the end user would take the form of a series of SEND and RECEIVE requests issued by the subroutine. The RECEIVE requests would include the operation code OPTCD=SPEC because the subroutine's interest in receiving data would extend only to the specific end user's session and not to any other session.

In this situation, a problem can arise if one of the other RECEIVE ANY requests remains pending (uncompleted) during this conversation. The subroutine may have issued its RECEIVE SPECIFIC requests to match its SEND requests in anticipation of getting specific information back from the end user in the conversation. If VTAM uses that specific information to complete the previously-pending RECEIVE ANY requests, however, the RECEIVE SPECIFIC requests might not be completed for a long time (more likely, the subroutine would eventually assume that an error had occurred).

The VTAM application can address this problem by specifying in its RECEIVE ANY requests that, upon completion of any one of these requests, VTAM should shift into RECEIVE SPECIFIC mode (i.e., suspend processing of RECEIVE ANY requests) for that particular session only until told otherwise. This may be done by including the operand "CONTINUE=SPEC" (for SPECIFIC) in the request parameter list RPL for each of the RECEIVE ANY requests.

If CONTINUE=SPEC is included in the example above, VTAM completes the first RECEIVE ANY request by delivering the end user's query to the VTAM application. Because of the CONTINUE=SPEC operand, however, VTAM at that point suspends processing RECEIVE ANY requests for that particular session.

Suppose now that the VTAM application's subroutine completes its handling of the end user's query by issuing a final SEND request (e.g., to report completion to the end user). The request parameter list RPL for this SEND command may include an operand CONTINUE=ANY to cause VTAM to resume processing of RECEIVE ANY requests for that session.

As documented in the VTAM Manual, a session's CONTINUE ANY|SPEC mode is tracked separately for each of the three different types of RECEIVE input that are permissible under VTAM, namely DFSYN (for normal data flows), DFASY (for expedited data flows), and RESP (for responses).

VTAM Session Termination; CLOSE of APPL

A VTAM application can terminate a session between itself and another logical unit LU (e.g., an end user operating a terminal) by issuing a CLSDST (Close Destination) or TERMSESS (terminate session) macro instruction to VTAM. This macro instruction may include the CID of the session in question to help VTAM identify the proper session to be terminated.

When all of a VTAM application's on-going sessions have been terminated and the application no longer needs any VTAM communications services, the application can take itself off-line, so to speak, by issuing a CLOSE macro instruction to end its communications with VTAM.

Single Session Limitations on End Users

Up to this point, the discussion has been from the perspective of the VTAM application. A limitation of much of the "installed base" of terminal hardware and other peripheral devices is usefully described from the perspective of the end user, e.g., a person operating a terminal device (which device operates as a logical unit LU as noted above).

Many if not most existing device-type logical units do not support more than one session at a time. That is, such an LU cannot be "in session" with more than one VTAM application at a time; nor can such an LU engage in multiple sessions with a single VTAM application, even though the VTAM application itself can engage in multiple sessions with different LUs.

Prior attempts have been made to address this installed-base problem with "add-in" software. These prior attempts appear to have been less than satisfactory.

One prior approach may be referred to as the "CLSDST PASS" approach. Generally speaking, an end user desiring to use a VTAM application logs on instead to a special session manager VTAM application that displays a menu of available VTAM applications. When the user selects an item from the menu, the session manager application issues a CLSDST PASS macro instruction followed by a SIMLOGON to VTAM to cause VTAM to terminate the end user's session with the session manager and to pass the end user to a new session with the VTAM application selected from the menu. This approach has the advantages including simplicity and low overhead, and it provides some user flexibility in logging on to other VTAM applications, but it also has disadvantages including permitting only one session at a time.

Another prior approach may be referred to as the relay session manager approach. In that appproach, a session manager VTAM application establishes numerous access method control blocks ACB, thus fooling VTAM into believing that the session manager application is actually several distinct applications (referred to below as virtual applications). An end user may establish a VTAM session with one of these virtual applications in the usual way described above; the session manager application in turn may establish multiple sessions with other VTAM applications and link these sessions among the end users logged onto the virtual applications.

In effect, an end user under the relay session-manager approach goes into a single session with the session manager VTAM application. The session manager in turn establishes multiple sessions with other VTAM applications, as directed by the end user, and relays information between them. While this approach permits multiple sessions as well as centralized mapping-type optimization, the overhead costs can be dramatic (among other problems).

Mapping-Type Optimization with Input Suppression

The commonly-owned patents referred to above in Section 1 teach methods of performing mapping-type optimization coupled with input suppression. Very generally speaking, mapping-type optimization involves reducing the size of an outgoing data stream, i.e., one being routed from a VTAM application to a terminal or other logical unit LU, e.g., for display on a terminal buffer. Such an outgoing data stream may include instructions for unnecessary repainting of the terminal screen with, e.g., characters that are identical to the characters that are already present on the screen—to that extent wasting the resources used to route the outgoing data stream. Mapping-type optimization generally entails:

(a) intercepting the outgoing signal;

(b) generating an updated-state map of the buffer as it is expected to exist after the LU's receipt of the outgoing signal, (c) comparing the updated-state map with a previously-created and -saved present-state map of the buffer to generate a difference map, and (d) generating a substitute outgoing signal that repaints only selected portions of the terminal screen, e.g., those portions that would actually change as a result of the outgoing signal.

"Input suppression" takes advantage of the present-state map to override instructions from an APPL to a terminal or other LU to transmit certain portions of its buffer contents back to the APPL regardless whether those portions have actually changed. An APPL may include such an instruction, for a given field in a terminal's buffer, by pre-setting the modified data tag (MDT) in the field attribute byte for that field.

When the terminal's user hits the ENTER key (or equivalent command), the terminal's control software causes it to transmit a data stream that includes the contents of all fields whose MDTs are set. A field's MDT may be set by the terminal itself in response to editing of the field contents by the terminal user, or it may be pre-set by the APPL as mentioned in the previous paragraph. In the latter case, the field is referred to as "premodified field."

The incoming data stream generated by the terminal would thus include the contents of any fields whose MDTs were pre-set by the APPL (where the MDTs were not otherwise cleared, e.g., by the ERASE INPUT command), regardless whether those contents had actually been changed by the terminal user. This results in unnecessary network traffic.

When an updated-state map of a terminal's buffer contents are saved for later user in mapping-type optimization, the contents of premodified fields are already available and thus need not be re-sent by the terminal. Thus, pre-set MDTs can be cleared. Because the APPL is expecting the contents of the corresponding premodified fields to form part of the incoming data stream, however, those contents can be "spliced" into the data stream by copying from the previously-saved map. cl SUMMARY OF THE INVENTION Under VTAM, or similar-type data communications system, co-executing "partner" processes typically exchange data via SEND and RECEIVE requests that are processed by VTAM. As described in detail in Sections 4.5 through 4.8 below, a method in accordance with the invention provides a means for optimizing this data exchange process. The optimized method bypasses VTAM to provide significant savings of system resources and improved execution speed over that required for VTAM to process the same SEND and RECEIVE requests.

BRIEF DESCRIPTION OF THE DRAWINGS

FIG. 5 depicts the general categorization of VTAM request units in certain systems as only-in-chain (OIC), first-in-chain (FIC), middle-in-chain (MIC), or last-in-chain (LIC).

Appendix 1 is a sequence chart outlining in general terms the steps taken in the generation of a typical VTAM macro instruction ("request") by an application program. Appendixes 2 through 6 are sequence charts outlining in general terms the steps in the generation of various types of VTAM requests by a VTAM application and the processing of the requests in accordance with various aspects of the invention.

DETAILED DESCRIPTION OF SPECIFIC EMBODIMENTS

Figure 9:
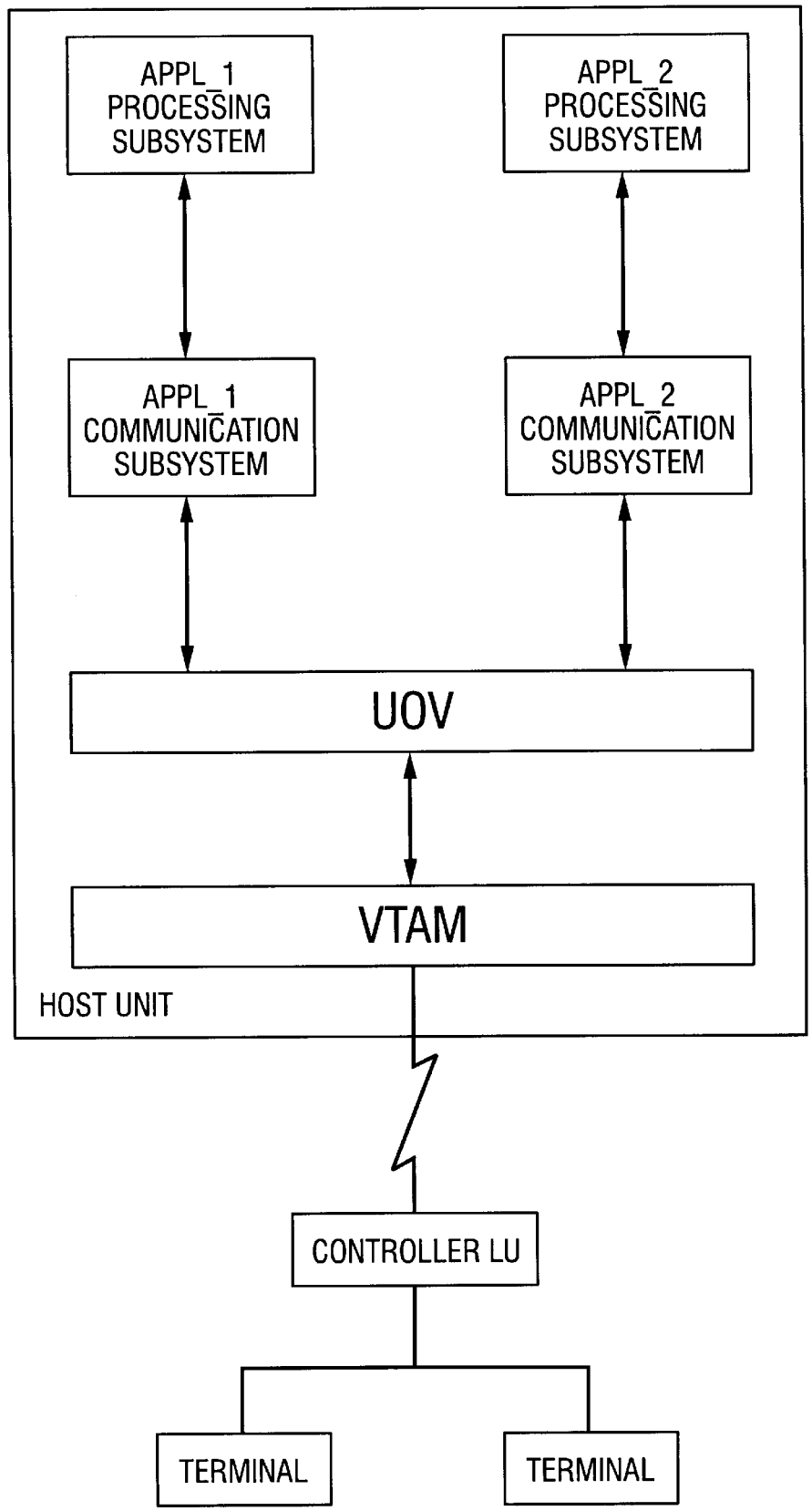
FIG. 9 is a simplified block diagram of the interaction of a system UOV in accordance with the invention with VTAM and an application APPL.

As shown in block-diagram form in FIG. 9, an illustrative embodiment referred to for convenience as UOV, operating in "Key 6" as a portion under the IBM MVS operating system, is described here in some detail. In the interest of clarity, not all features of an actual implementation are described. It will of course be appreciated that in the development of any such actual implementation (as in any software development project), numerous programming decisions must be made to achieve the developers' specific goals and subgoals (e.g., compliance with system- and business-related constraints), which will vary from one implementation to another. Moreover, attention will necessarily be paid to, e.g., proper serialization to handle concurrent events such as issuance of RECEIVE requests at the same time as the arrival of incoming data. It will be appreciated that such a development effort would be complex and time-consuming, but would nevertheless be a routine undertaking for those of ordinary skill having the benefit of this disclosure.

OPEN Processing by UOV

Referring to Appendix 2, the processing of an OPEN request is handled by UOV as described in this section.

An application APPL creates an access method control block ACB; the application may also create an exit routine list EXLST (step 2–10). Both steps are conventional as described above.

The application APPL issues an OPEN macro instruction that it intends be processed by VTAM. This OPEN macro instruction includes, as passed parameters, pointers to the application APPL's access method control block ACB and its exit routine list EXLST if any. (Steps 2–20 and 2–30.) These steps too are conventional as described above.

VTAM, however, never receives the OPEN instruction from the application APPL. This is because UOV "hooks" the OPEN instruction, i.e., intercepts it prior to its processing by VTAM, in any convenient manner (e.g., by overwriting the address of the VTAM routine that handles OPEN instructions with the address of the corresponding UOV routine). Hooking is conventional and familiar to those of ordinary skill. A particularly useful hooking process is described in co-pending Ser. No. 07/062,436, by David B. Loader, a counterpart of which was published Jan. 4, 1989, as European Patent Application No. 88109383.5, and commonly assigned with this application, but any convenient hooking technique may be used.

UOV copies the access method control block ACB to a new access method control block ACB_X (step 2–40). UOV also constructs a new exit routine list EXLST_X (step 214 50). The contents of this list identify UOV's exit routines instead of the application APPL's exit routines, even if the application APPL had no exit routine list in the first place.

UOV issues a substitute OPEN instruction to VTAM (steps 2–60 and 2–70). The substitute OPEN instruction includes as passed parameters the addresses of the new access method control block ACB_X and the new exit routine list EXLST_X. This results in the new access method control block ACB_X being registered with VTAM as associated with a VTAM application.

Figure 1A:
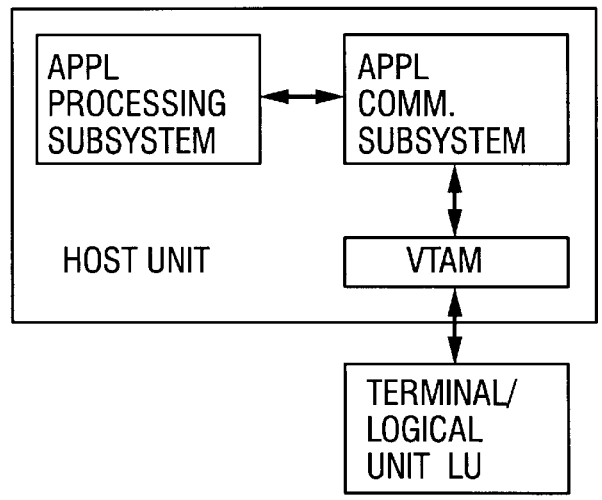
FIG. 1A is a simplified block diagram of a hypothetical prior-art Systems Network Architecture (SNA) network
Figure 1B:
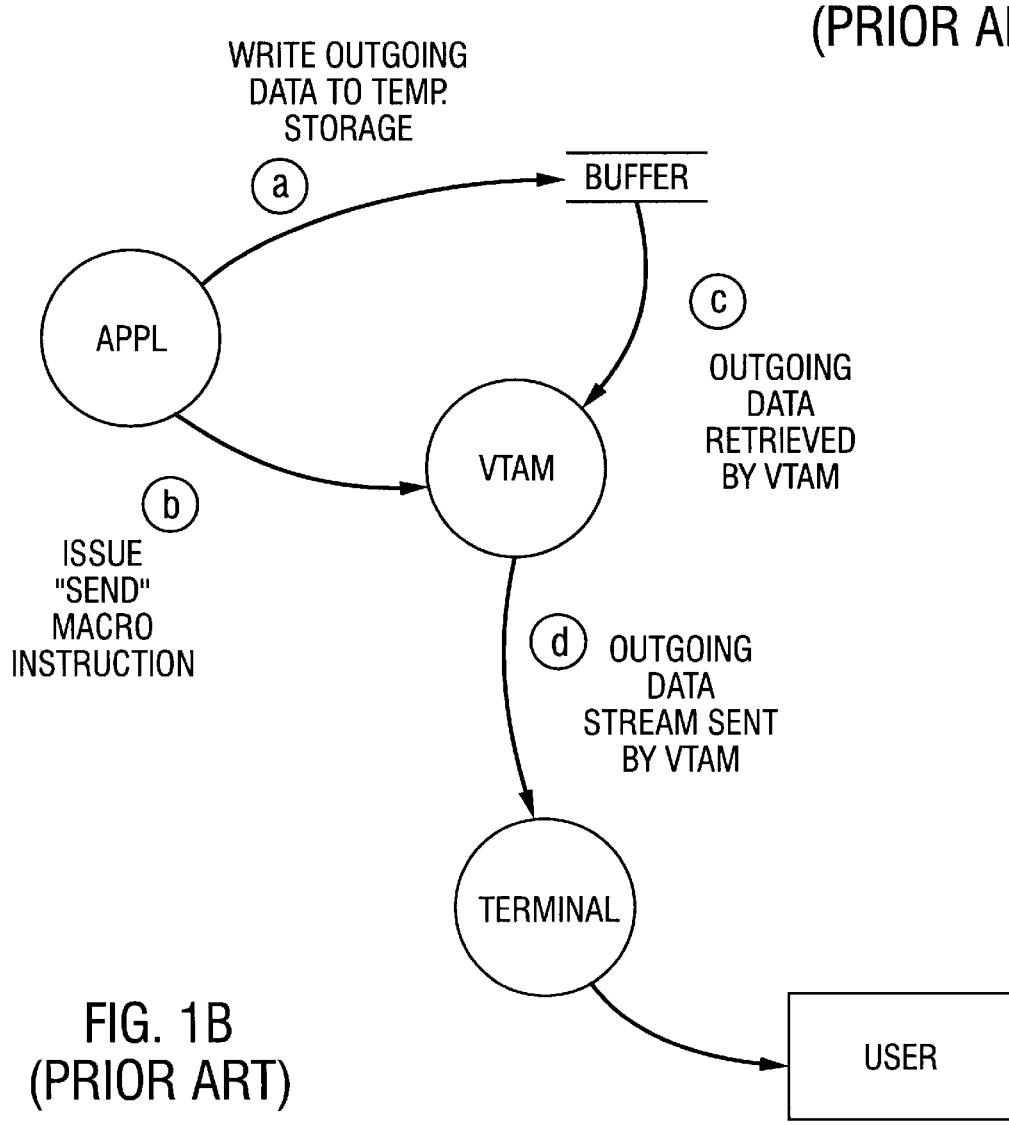
FIG. 1B is a simplified data flow diagram of a typical SEND macro instruction in network using a VTAM-type communications management system used on such a network.
Figure 2:
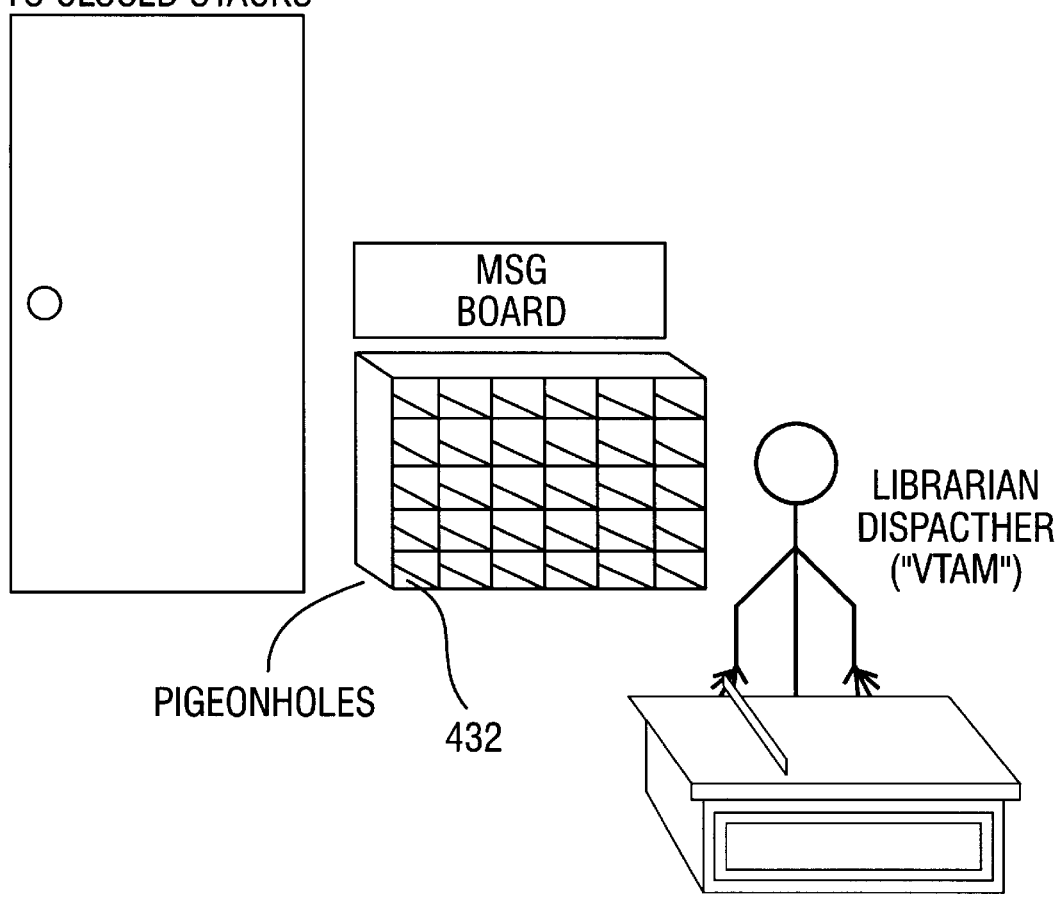
FIG. 2 is a depiction of the "library stacks researcher" analogy used in Section 1 above.
Figure 2:
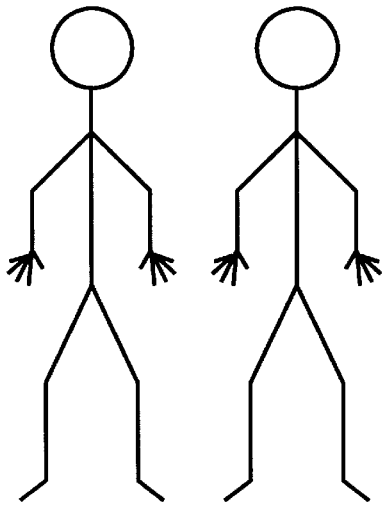
Figure 2:
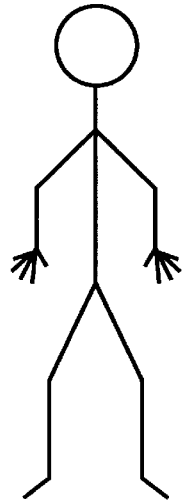
Figure 3:
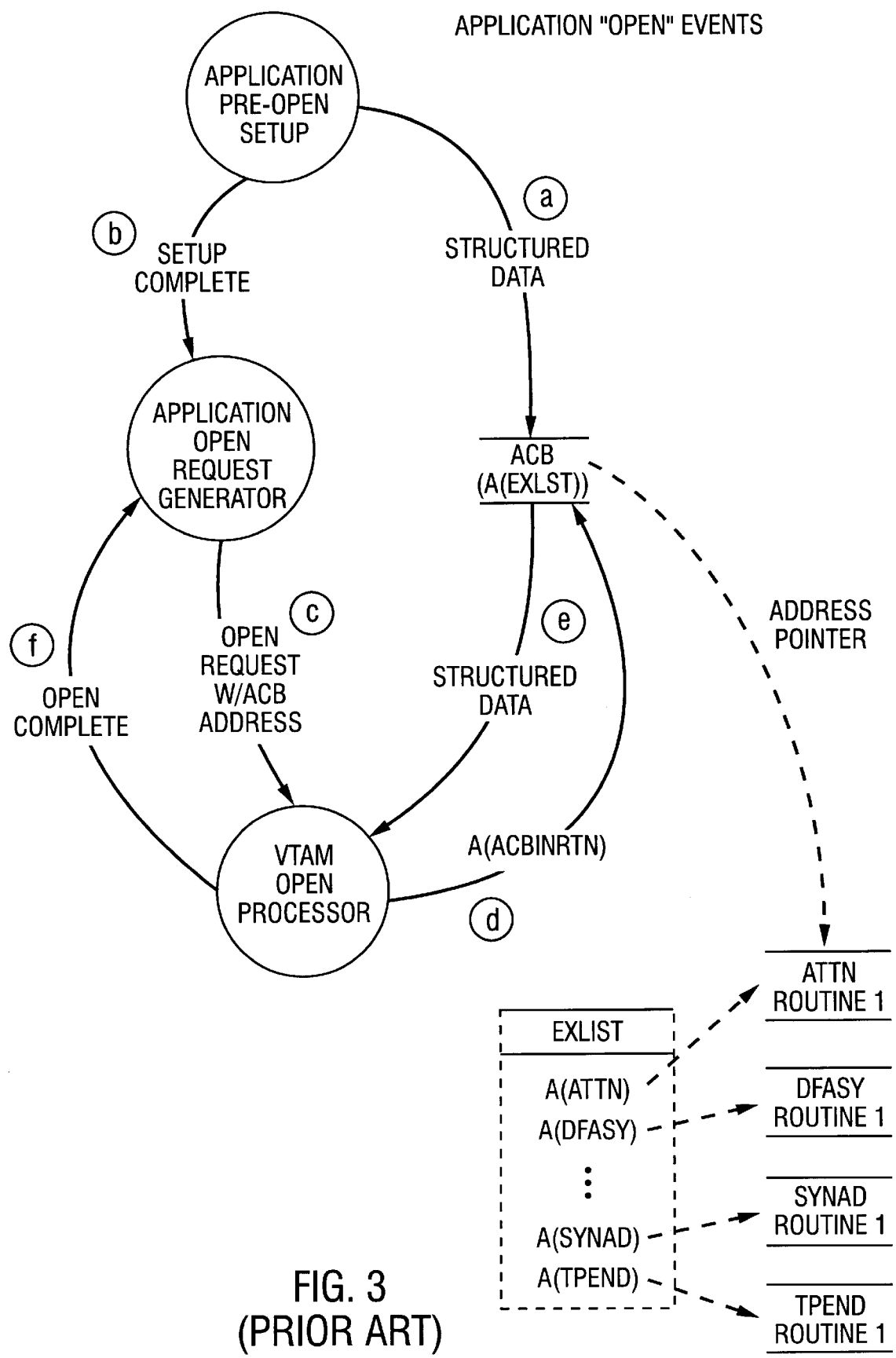
FIGS. 3, 4, and 6, 7 and 8 are simplified Yourdon-DeMarco diagrams of data flows occurring in the conventional processing of OPEN, session-initiation, SEND, and RECEIVE events respectively in a VTAM network.
Figure 4:
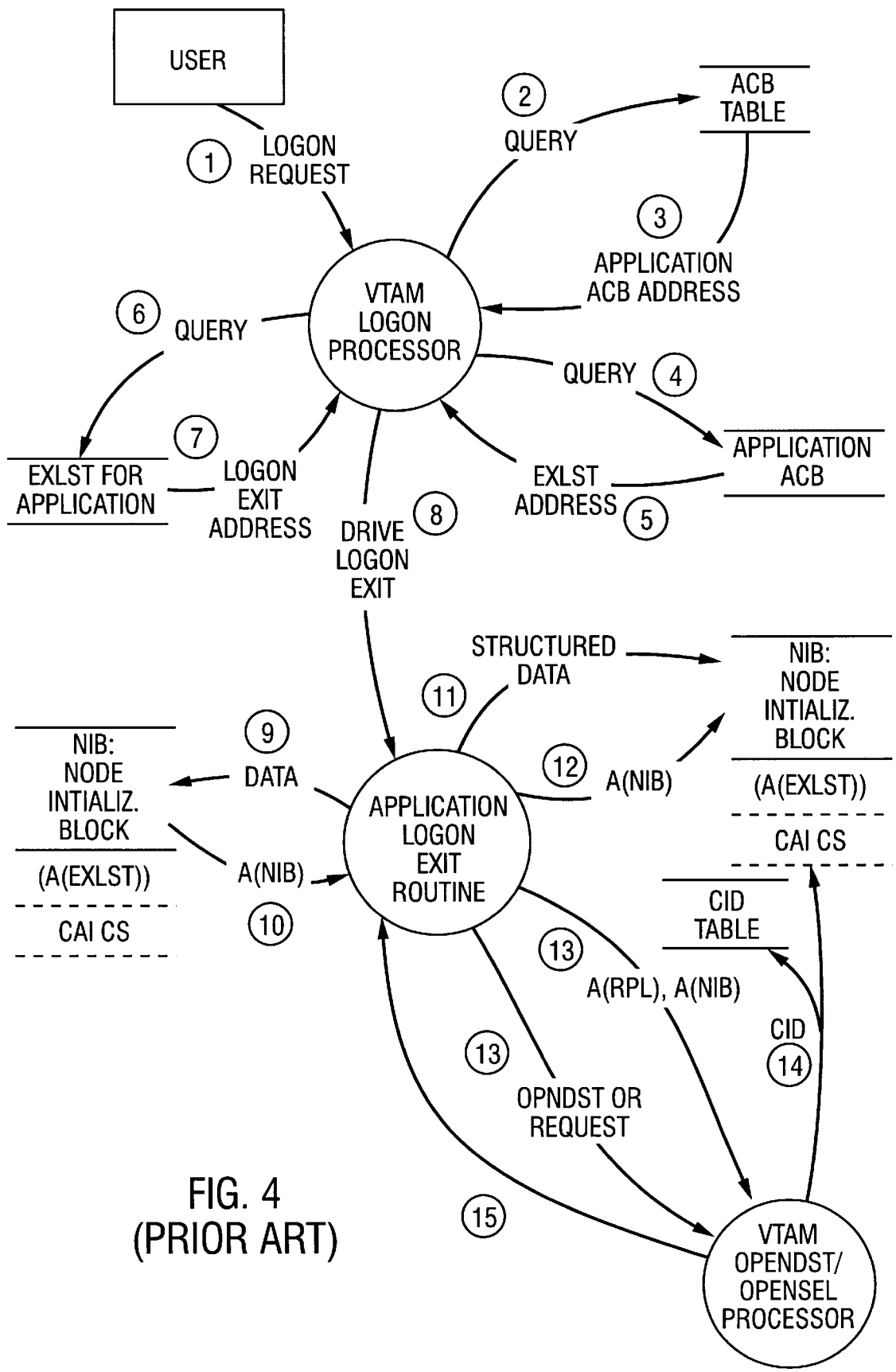
Figure 6:
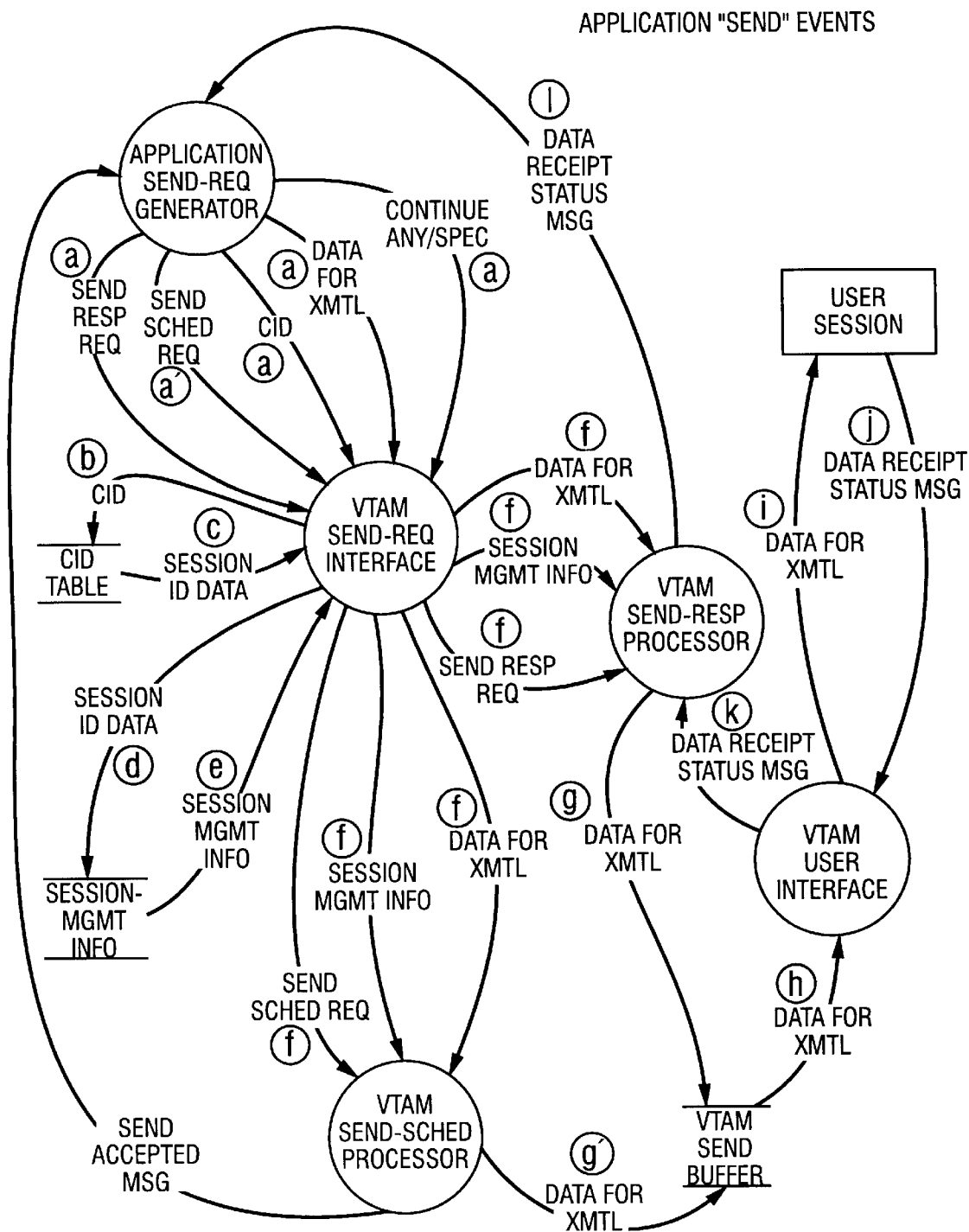
Figure 7:
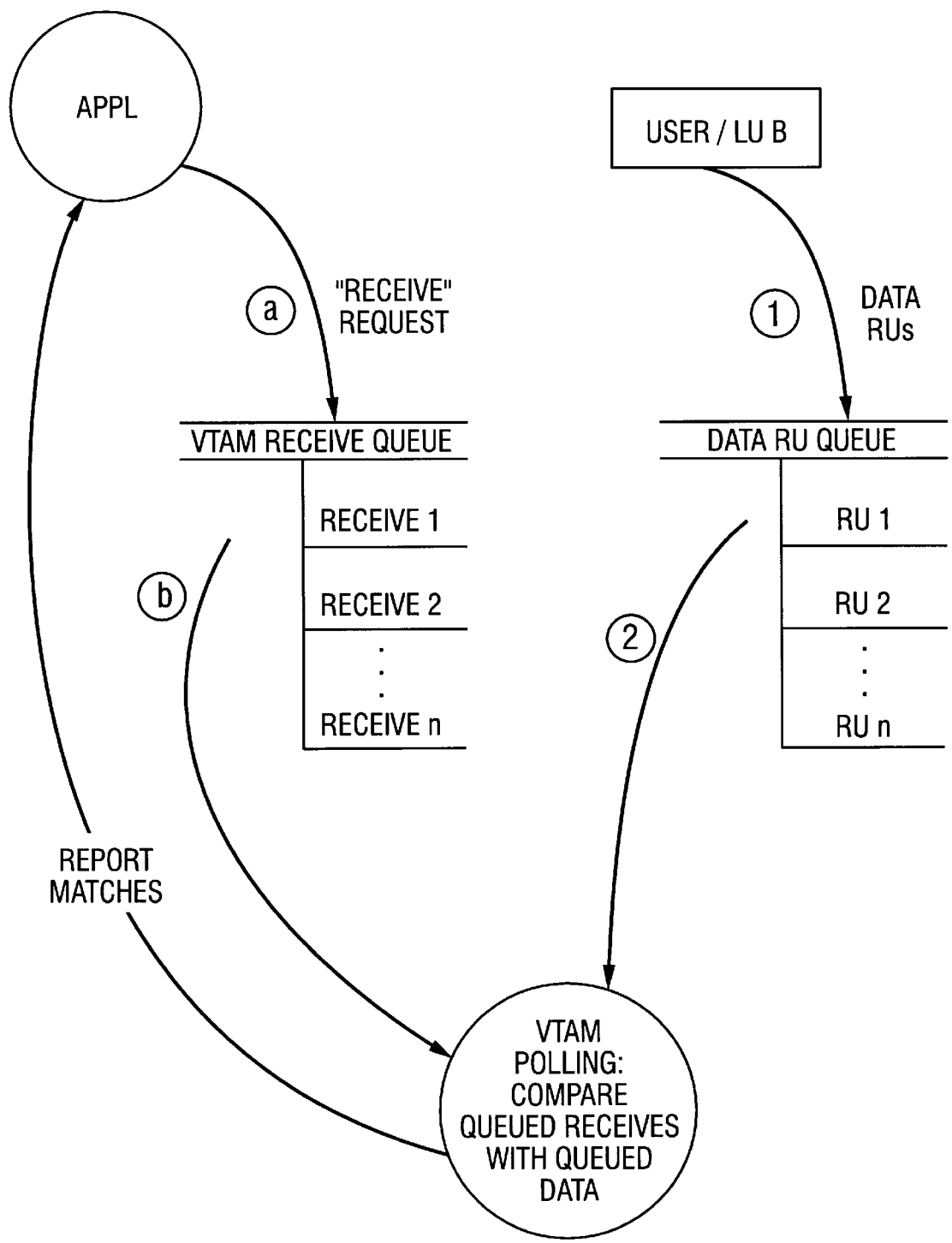
Figure 8:
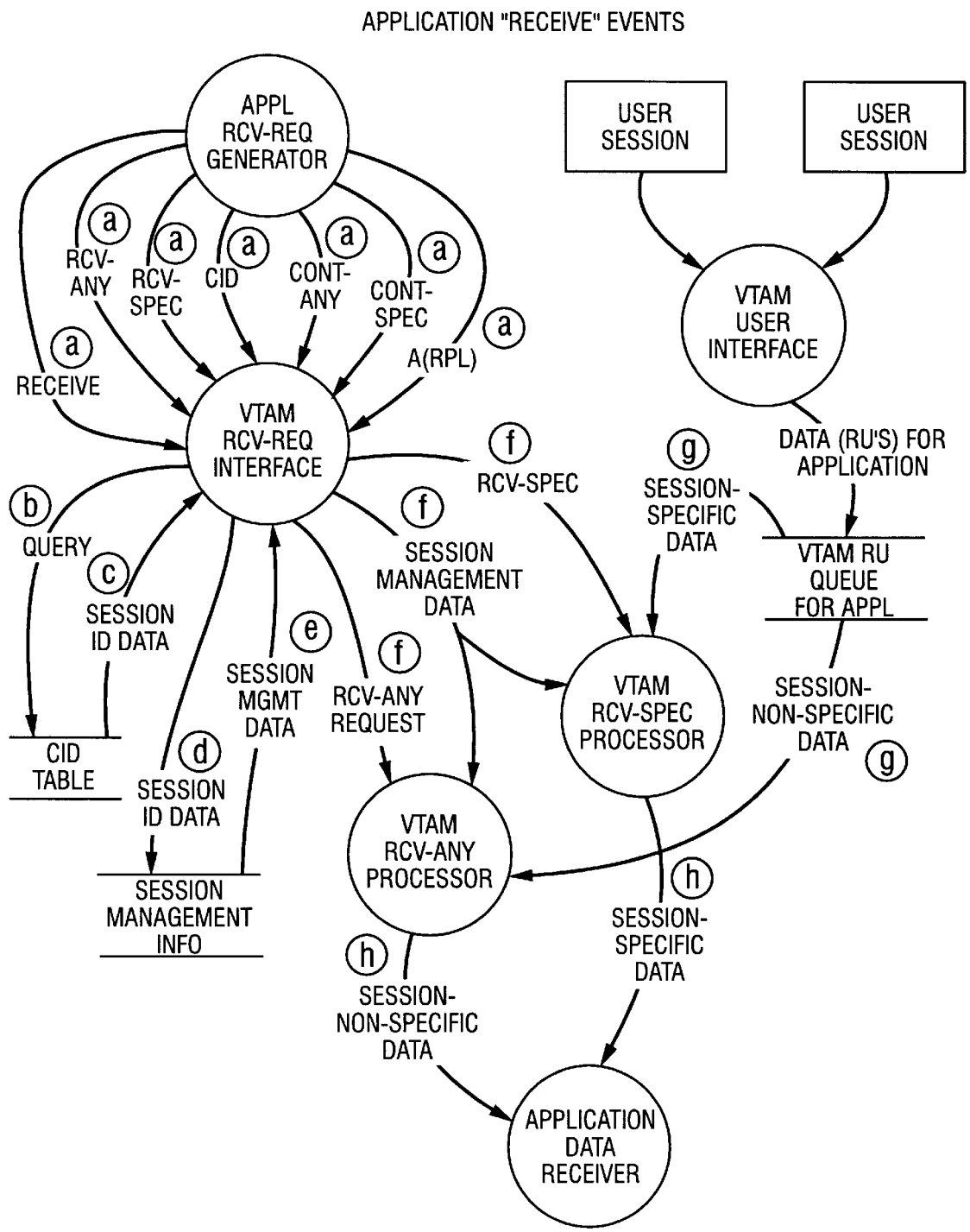

As part of the conventional processing of UOV's substitute OPEN instruction, VTAM updates certain fields in the new access control block ACB_X and inserts the address of the VTAM interface routine into the access control block interface routine field ACBINRTN of ACB_X (step 2–80; see also FIG. 3). As is well known to those of ordinary skill, the VTAM interface routine is a VTAM routine to be driven (i.e., to which control is to be passed) by a VTAM application program if and when further VTAM services are desired by the application program.

Assuming no errors, VTAM eventually signals UOV that the substitute OPEN instruction was successfully completed (step 2–90).

UOV copies the contents of all but one of the fields in the new access method control block ACB_X to the corresponding fields in the application APPL's control block ACB (step 2–100). The one field whose contents are not copied (or if copied are later erased or overwritten) is the access control block interface routine field ACBINRTN. UOV writes the address of its own interface routine into this field ACBINTRN in the APPL's ACB (step 2–110). Thus, when the application APPL attempts to drive the VTAM interface routine, the UOV interface routine is driven instead.

UOV writes a conventional message, indicating successful completion of the application APPL's OPEN instruction, to the same address as VTAM would have done if VTAM had successfully processed that OPEN instruction (normally a zero to register 15. UOV then passes control, previously "hooked" as described above, back to the application, which is tricked by the successful-completion message into believing that its OPEN instruction was completed by VTAM as originally intended.

UOV concludes its processing of the application APPL's OPEN instruction by issuing a single RECEIVE ANY instruction to VTAM, specifying the address of the new access method control block ACB_X in the request parameter list RPL (step 2–120). UOV's RECEIVE processing is discussed in more detail below. A control block referred to as a VDB, used to store various data relating to the application APPL as discussed in more detail below, is also established.

Thus, the new access method control block ACB_X, created by UOV, has been OPENed between VTAM and the application. The application APPL nevertheless believes that its original ACB has been so OPENed even though it has not.

Processing of VTAM API Requests from APPLs

As noted above in Section 4.1, UOV writes the address of its own interface routine into the field ACBINTRN in the access control block ACB that was created by the application APPL. As a result, VTAM API-compliant macro instructions issued by the application APPL are in fact directed to UOV even though the application intends to direct those instructions to VTAM.

When UOV processes such a VTAM API request by an application, e.g., SEND, RECEIVE, RESETSR, OPNDST, etc., it does so by acquiring (allocating storage for) an internal control block VWA; copying the request parameter list RPL specified by the application into the VWA; validating all storage addresses in accordance with standard VTAM conventions; and reissuing the request to VTAM in "authorized path" mode in order to save CPU time. The VWA is also used in queueing certain of these requests as discussed below, e.g., the SEND PEND queue, the RECEIVE queue, etc.

"Real" Session Establishment by UOV

Referring to Appendix 3, an end user or other logical unit LU may elect to attempt to establish a "real" or direct session with the VTAM application APPL by sending an appropriate request to VTAM (e.g., a CINIT request) in the usual way, as discussed above (step 3–10). Also as discussed above, VTAM normally responds by attempting to drive (pass control to) the appropriate exit routine of the application APPL (e.g., the LOGON exit routine).

Recall, however, that UOV substituted its exit list EXLST_X addresses for those of the application APPL. As a result, the exit routine actually driven by VTAM is an UOV routine (step 3–20). The exit list EXLST_X is structured so that the UOV LOGON exit routine is the routine driven, whether or not the LOGON exit corresponds to the type of session-establishment request issued by the logical unit LU. This beneficially permits UOV to issue an INQUIRE request to VTAM, resulting in the return by VTAM of correct session parameters.

In particular, session-establishment requests that would normally lead to the issuance by UOV of an OPNDST ACQUIRE macro instruction, which is a way of opening a session without driving the LOGON exit routine, are handled with a SIMLOGON (simulated LOGON) macro instruction, which does result in driving of the LOGON exit routine.

Eventually, however, the application APPL's exit routine is driven, only by UOV instead of by VTAM (step 3–80). Execution of this exit routine culminates in the issuance of an OPNDST macro instruction by the application APPL (step 3–90), as described in more detail in Section 1.3 above.

UOV in effect hooks the APPL's OPNDST macro instruction (step 3–120). This is because the application APPL issues the instruction by passing control to what it thinks is the VTAM interface routine whose address is contained in the ACBINRTN field of the access method control block ACB. The actual address in that field, however, is that of the UOV interface routine as described in Section 4.1 (see also step 2–110).

UOV then performs initial processing of the OPNDST macro instruction in the same general manner as VTAM would do (step 3–140), as documented in various IBM publications relating to VTAM and well known to those of ordinary skill. UOV is thus able to reject most incorrect session-establishment requests immediately, meaning that VTAM is not contacted for any processing of these requests.

For those session-establishment requests that are not rejected, UOV builds a session control block SCBE (step 3–150). This control block includes the information written by the APPL to its NIB during the APPL's processing of the session-establishment request. The SCBE is also used for other data storage as described below.

UOV then establishes a session in a conventional way between itself and the logical unit LU that requested the session with the application APPL (step 3–160).

Notably, in establishing the session, UOV overwrites the communications identifier field CID of the access method control block ACB_X with the address of its session control block SCBE (step 3–190). This advantageously permits UOV to perform look-up operations in a session's SCBE in a single step directly from the SCBE address in CID field. In contrast, in conventional VTAM processing, control-block information for a session is stored in a table keyed to the CID; an extensive and repetitive look-up process is required to obtain control-block information. In addition, UOV uses a conventional use-count approach to avoid repeated validation of the control block SCBE.

"Virtual" Session Establishment by UOV

If the user elects to establish a "virtual" session and thus to permit multiple sessions on a single-session device-type logical unit LU, then UOV emulates the function of a relay session manager. In that situation, a typical user logs on to UOV and establishes a conventional session between UOV and the logical unit LU. It is believed that in one relay-type session manager, at this point the session manager opens an access control block ACB which is to act as a secondary logical unit LU, then issues a REQSESS (request session) macro instruction referring to this ACB and specifying the primary ACB with which it wishes to establish a session. As previously discussed, VTAM then normally completes the establishment of a conventional relay session.

In contrast, UOV does not open a new ACB in emulating a relay session manager. Instead, UOV directly drives the LOGON exit routine of the application APPL for which a session is desired by constructing a CINIT request unit RU and driving the APPL's LOGON exit routine. The application APPL then goes about session establishment by issuing an OPNDST ACCEPT macro which UOV intercepts and processes fully as for "real" session establishment, except that the OPNDST ACCEPT is not passed to VTAM. Hence, the application APPL thinks that it has established a session with VTAM, whereas in fact only a virtual session has been established.

Putting it another way, in virtual session establishment UOV emulates most, but not all, of the functions that VTAM would normally perform in establishing a session. UOV does not emulate functions normally performed by VTAM that would cause problems in virtual session establishment, however, e.g., sending a BIND instruction from the application APPL or driving the SCIP BIND exit routine if the secondary logical unit is an application. Instead, UOV immediately reports completion of the OPNDST issued by the application APPL back to the APPL and does not send it to VTAM; it thereby "fakes out" the application APPL. Likewise, if the application APPL issues a CLSDST instruction to close a session, UOV immediately reports to the application that the instruction has been completed, then performs its own clean-up operations the SCBE; UOV does not send an UNBIND to VTAM for the device (because disconnecting the device is undesired at this point).

A significant advantage exists in this arrangement. Because UOV is not a relay-type session manager, when the application APPL issues, say, a SEND macro instruction, UOV does not need for one of its own RECEIVES to be processed by VTAM (to get the SEND data to UOV), then for another SEND instruction to be issued by UOV to get the data to the user. This saves approximately 110,000 instructions for a complete SEND/RECEIVE loop between the application APPL and the user/logical unit LU.

Setup for Bypass SEND/RECEIVE Processing by UOV

Figure 11:
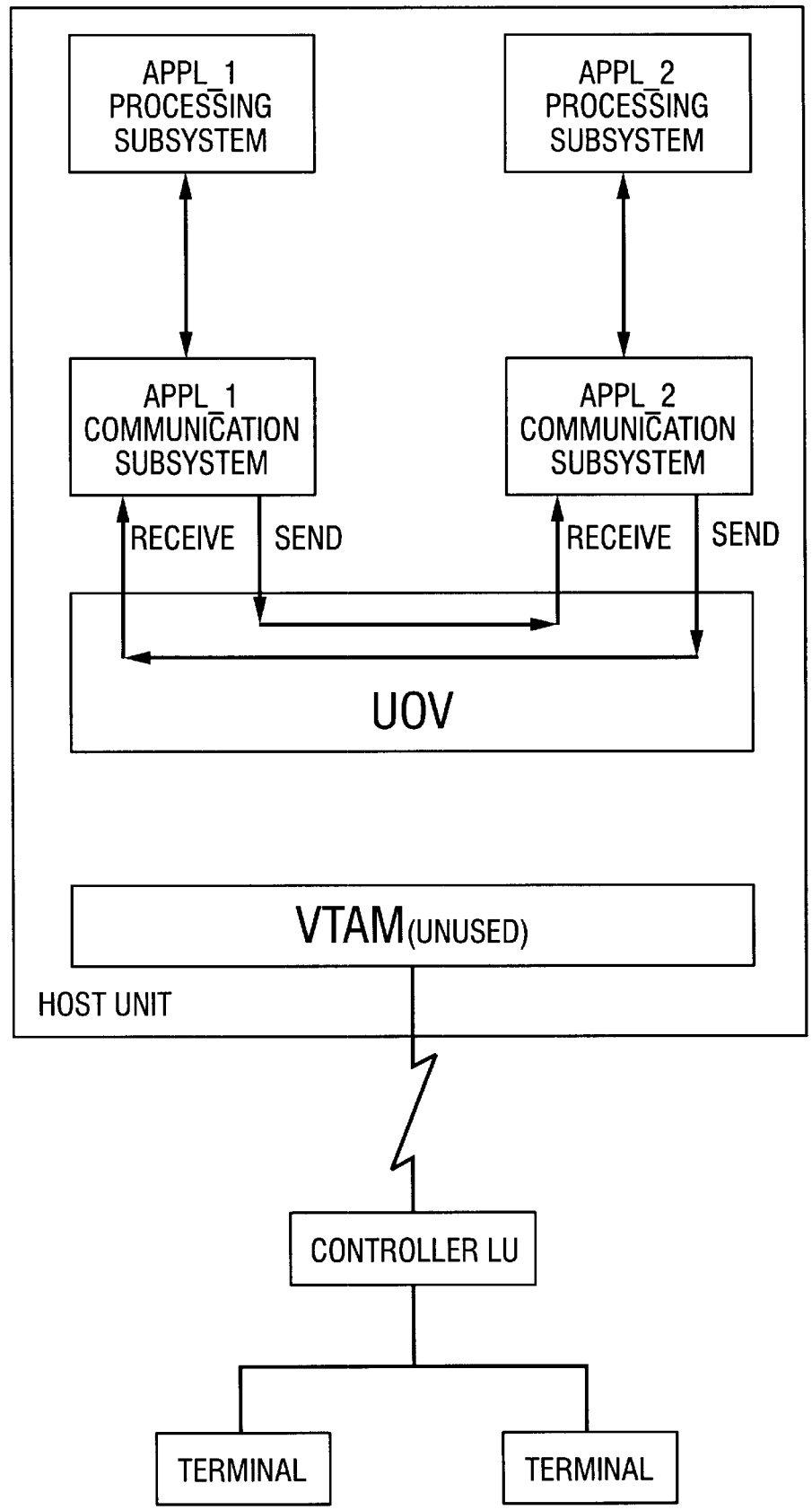
FIG. 11 depicts handling of partner-session SEND and RECEIVE requests in accordance with one aspect of the invention.

In establishing a "real" session, UOV determines whether a second VTAM application APPL_2 executing on the host computer is attempting to go into session with a first application APPL, with the second application APPL_2 acting as the secondary logic unit SLU and the first application APPL acting as the primary logic unit PLU. In effect, the two VTAM applications would be going into session together to permit them to use VTAM to exchange information; toward that end, each application requests that VTAM establish a session link between itself and VTAM. If this is the case, the two requested sessions from the two VTAM applications are treated as "partner sessions" eligible for bypass-SEND-and-RECEIVE handling (BSR) as illustrated in FIG. 11 and explained below in Section 4.8. In particular, a partner-sessions indicator is created in the session control block SCBE for each of the sessions established by UOV; likewise, a pointer is written to each SCBE, pointing to the other SCBE. These are used in BSR processing as described below. It is believed, but has not been empirically verified, that this approach can be generalized to the reverse situation, i.e., in which a primary logic unit PLU attempts to go into session with a secondary logic unit SLU.

UOV Matching of Incoming Data and RECEIVE Requests

As shown in Appendix 5, UOV performs VTAM-like functions in processing incoming data along with APPL-generated RECEIVE requests. Generally speaking, UOV:

(1) receives, via VTAM, incoming data request/response units RU from logical units LU operating in various sessions (e.g., end users at remote terminals);

(2) expands any "input-suppressed" incoming RUs;

(3) queues the incoming RUs to selected control blocks for the various sessions;

(4) queues any RECEIVE macro instructions issued by the application APPL that is not immediately completed with an incoming request unit RU, with RECEIVE SPEC instructions for a given session being queued separately but with all RECEIVE ANY instructions being queued together;

(5) matches the incoming RUs with pending RECEIVE ANY and/or RECEIVE SPEC requests issued by the respective APPLs for their various sessions, in proper sequence; and (6) notifies the APPLs of matched (i.e., completed) RECEIVE requests by POSTing the requests as completed.

Delivery of RUs to UOV by VTAM. UOV receives incoming RUs from VTAM in the usual manner (FIG. 5). UOV repeatedly issues a single RECEIVE ANY request (with an authorized-path parameter to save processing time) to enable it to gather in any incoming RUs that VTAM acquires. UOV issues RECEIVE SPEC requests only to complete its own RECEIVEs involving overlength data. Because of this, and the fact that UOV handles sequencing of incoming RUs on its own, the VTAM processing of incoming RUs boils down in essence to simply completing UOV's repeatedly-issued RECEIVE ANY requests. UOV queues the incoming RUs delivered by VTAM; waits for all RUs in an incoming chain of RUs (i.e., an incoming data stream) to be delivered by VTAM; then takes over, eventually to route the RU contents to the appropriate VTAM application APPL as discussed below.

Figure 10:
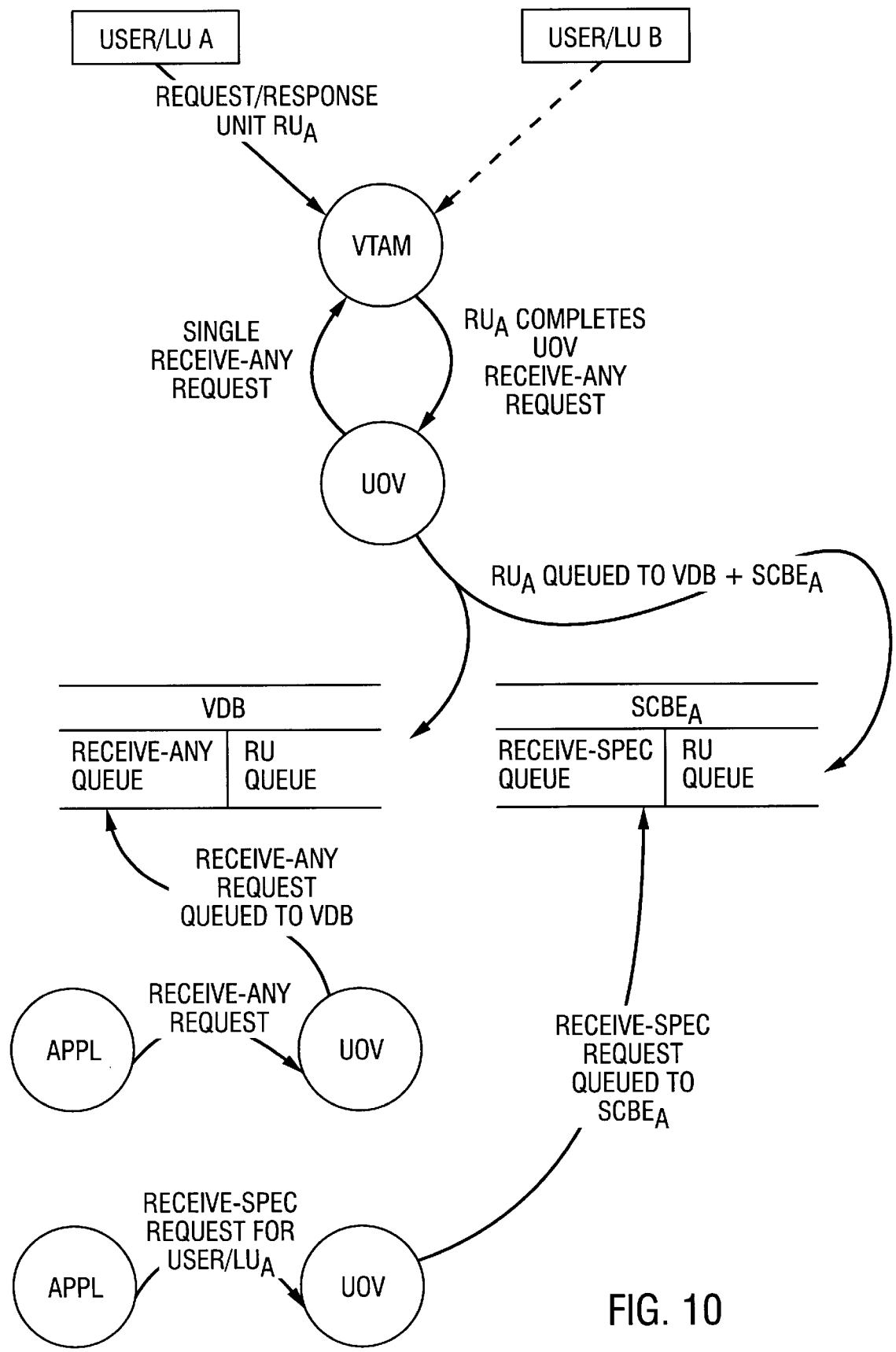
FIG. 10 depicts queueing of RECEIVE requests and incoming request/response units RU in accordance with one aspect of the invention.

Two separate queues for incoming request/response units RU that are not used to complete a RECEIVE request and for uncompleted RECEIVE ANY or RECEIVE SPEC macro instructions are maintained by UOV. As illustrated in FIG. 10, incoming request/response units RU for a hypothetical session for a user/logical unit $LU_A$ are queued both to a control block VDB maintained by UOV for the application APPL and to a session control block $SCBE_A$ maintained by UOV for the session for the user/$LU_A$. As discussed in more detail below in Section 4.6(c), RECEIVE SPEC macro instructions issued by the application APPL are queued to the session-specific $SCBE_A$, while the more general RECEIVE ANY instructions are queued to the control block VDB.

One-to-Many RECEIVE Expansion. A chain of one or more incoming RUs may be part of an "input-suppressed" incoming data stream. That is, the RUs may be en route from a terminal or other logical unit LU to a VTAM application APPL that expects the incoming data stream to include the contents of certain premodified fields.

As explained in the patents referred to Section 1, a premodified field is a field in, e.g., the display buffer of the terminal or other logical unit LU ("peripheral unit"), for which the modified data tag (MDT) of the field attribute byte was preset by the APPL via an outgoing data stream. An input-suppressed incoming data stream is one that comes from a terminal or other LU in which one or more fields was to have been premodified in this way, but to which a substitute outgoing signal was routed instead, with the preset MDT being cleared in the substitute outgoing data stream.

The APPL nevertheless expects the incoming data stream to include the contents of the premodified field. To accommodate the APPL's expectation, UOV expands the queued incoming RU chain received from VTAM to include the premodified-field contents as copied from the previously-saved buffer map.

UOV breaks the (expanded) queued incoming RU chain into new RUs if necessary. In doing so, UOV conforms to the maximum RU size for the APPL's session, which it obtains from the session control block SCBE. The new RUs are delivered to the APPL as explained in the next subsection. "Overlength data" conditions in which a RECEIVE is issued by an application APPL with a buffer of insufficient size to handle the expanded incoming RU chain, are handled in a similar fashion.

Sequence number of incoming request/response units RU are incremented once per normal flow RU. The sequence numbers are adjusted to account for the virtual sequence numbers maintained by UOV, thus ensuring that each incoming RU can be identified by the application APPL with the sequence number expected by the APPL.

Queueing and Completion of APPL RECEIVE Requests. As illustrated in FIG. 10, like VTAM, UOV maintains a queue—actually multiple queues—of pending (incompleted) RECEIVE requests issued by each VTAM application APPL. An APPL's RECEIVE SPEC requests specific to the session for user/$LU_A$ are queued to the session control block $SCBE_A$. All RECEIVE ANY requests issued by the application APPL, which by definition can be completed by incoming data from any session that is in CONTINUE ANY mode, are queued to the control block VDB for the APPL. This facilitates proper handling of RECEIVE ANY and RECEIVE SPEC requests by UOV.

UOV completes the queued pending RECEIVEs in the same general manner as VTAM. As noted above, in conventional VTAM processing a given incoming RU might or might not be useable or "eligible" to complete a given RECEIVE request; this will depend in part on whether the session is in CONTINUE ANY or CONTINUE SPEC mode and on the type of RECEIVE request (e.g., DFSYN, DFASY, and RESP), all as well known to those of ordinary skill. Generally speaking, when a RECEIVE request is issued by an application APPL, UOV checks the appropriate RU queue for any unused RUs; if no unused RUs are in the queue, UOV queues the RECEIVE request. Similarly, when an incoming RU is delivered to UOV by VTAM, UOV checks the appropriate RECEIVE queue to determine whether any uncompleted RECEIVEs could be completed by the incoming RU; if not, the RU is added to the appropriate queue.

Referring again to FIG. 10, for example, if the session for user/$LU_A$ is in CONTINUE SPEC mode, then incoming RUs from that session are to be used by UOV only to complete RECEIVE SPEC instructions and should not be used to complete RECEIVE ANY instructions. In that situation, UOV checks only the RECEIVE SPEC queue on the session control block $SCBE_A$ for the specific session; it uses any incoming RUs queued to the $SCBE_A$ to complete pending RECEIVE SPEC instructions specific to the session for user/$LU_A$. On the other hand, if that session is in CONTINUE ANY mode, then incoming RUs from any session can be used to complete any pending RECEIVE ANY instructions. UOV accordingly first checks the RECEIVE SPEC queue on the control block $SCBE_A$ and uses any incoming RUs to complete pending RECEIVE SPEC instructions; if no RECEIVE SPEC requests remain to be completed, any leftover request/response units RU are used to complete any RECEIVE ANY requests queued to the control block VDB.

UOV completes queued RECEIVE requests by copying the contents of queued and eligible incoming RUs (expanded if necessary) to a storage area accessible to the APPL, then notifying the APPL that the RU contents are now available. Because the APPL is expecting more incoming data than is actually contained in the input-suppressed signal, it (the APPL) can be expected to issue sufficient RECEIVE requests to accommodate the expanded incoming RUs.

A request/response unit RU that is used by UOV to complete an application APPL's RECEIVE instruction in this manner is dequeued from both the control block VDB and the session control block SCBE. Thus, if all queued incoming RUs for a session are "used up" in completing RECEIVE ANY requests queued on the VDB (while the session is in CONTINUE ANY mode), it follows that any RECEIVE SPEC requests issued by the application APPL for the session and queued on the SCBE will remain queued because no incoming RUs are available on the SCBE queue.

The request parameter list RPL for an APPL's RECEIVE request may specify that a particular exit routine of the APPL (commonly referred to as a "user exit routine") is to be queued for driving by VTAM to indicate completion of the RECEIVE request. Accordingly, UOV maintains its own queue of such exit routines and schedules them for driving in the same manner as VTAM as discussed in more detail in Section 4.10.

SEND Processing by UOV

Referring to Appendix 4, when a SEND request is issued by a VTAM application APPL (see step 4–10), the UOV interface routine is driven instead of the VTAM interface routine, because of UOV's previous overwriting of the ACBINTRTN field in the APPL's access control block ACB as discussed above in Section 4.1. UOV queues the SEND request to one or both of two SEND queues that it maintains, as discussed in more detail below.

The POST=RESP Queue. As noted in Section 1.4(b), an application APPL issuing a SEND macro instruction to VTAM can specify that the request should not be signalled as completed until a success/no-success response has been received from the destination logical unit LU to which the SEND is being sent. This is referred to as a SEND POST=RESP macro instruction.

What is believed to be an undocumented feature of VTAM is that it appears implicitly to treat a SEND POST=RESP macro instruction in a similar manner as though a SEND/RECEIVE pair had been issued by the application APPL, that is, a SEND macro instruction for sending data together with a "phantom" RECEIVE instruction for receiving a (definite) response. (The VTAM Manual indicates that the application APPL does not issue a RECEIVE to obtain the response.) This creates a potential problem for UOV, in that a logical unit LU is likely not only to send back a success/no-success definite response, as called for by the SEND POST=RESP issued by the application APPL, but also to send back data of one kind or another.

It has been observed that under some circumstances, incoming normal-flow data could be received by VTAM from the logical unit LU in response to a normal-flow SEND POST=RESP prior to receipt of the LU's normal-flow success/no-success response as viewed by UOV at the VTAM API. That could result in what amounts to a race for the application APPL's user exit queue, in that UOV could process the incoming data and attempt to pass it on to the application APPL before passing on the success/no-success response. This in turn would mean that the application APPL would not be expecting the incoming data and could process it incorrectly.

To address this problem, UOV does not simply reissue a SEND POST=RESP macro instruction to VTAM as received from the application APPL for normal-flow SENDs. Instead, a substitute SEND POST=SCHED instruction is issued to VTAM. In addition, an indicator corresponding to the SEND as originally issued by the application APPL is queued on a POST=RESP queue for the session in question. Because responses to normal-flow SENDs are themselves normal flows, the response to the SEND POST=SCHED will always come back in to the application APPL before the subsequent incoming data from the LU, because UOV's single RECEIVE ANY guarantees receipt of the response at the VTAM API prior to receipt of the incoming data at the API.

Because both the logical unit LU's response to the SEND POST=SCHED and the LU's incoming data are treated by VTAM as eligible to complete a RECEIVE ANY, each causes completion of UOV's then-current RECEIVE ANY, as discussed in more detail above in Section 4.6(c). UOV receives the response (before it receives the incoming data because of the normal-flow handling), queues it to its own RECEIVE queue, and checks its POST=RESP queue to determine whether the just-completed RECEIVE ANY matches a pending SEND POST=RESP macro instruction issued by the application APPL. Because this is in fact the case, UOV schedules completion of the APPL's SEND POST=RESP macro instruction, then issues another RECEIVE ANY again, after the SEND POST=RESP is safely on the user exit queue if requested.

Consolidation of Chained SEND RUs for Mapping-Type Optimization. As discussed above in Section 1.4(a), sometimes a VTAM application APPL sends a message to a terminal or other logical unit LU that is too big to fit into one request/response unit RU. Mapping-type optimization of the outgoing data stream is generally not practical in this situation because that requires the complete data stream.

Accordingly, when UOV processes a SEND request involving a chain of RUs, it consolidates the chained RUs for mapping-type optimization. This optimization may include "input suppression" as taught in the patents referred to in Section 1.

If an RU is a first-in-chain or middle-in-chain RU, it follows that more RUs in the chain will be coming. UOV therefore writes a SEND-completion message and passes control back to the APPL to permit the APPL to continue execution; it queues the RU data to be consolidated with the forthcoming data (step 4–30).

On the other hand, if the RU is an only-in-chain or last-in-chain RU, it follows that no more RUs are coming and the chain of RUs is complete. UOV again writes a SEND-completion message to pass control back to the APPL, and consolidates all chained RU data into a single buffer.

(Even without optimization, in some installations the maximum RU size specified by an APPL may be inefficient. UOV may optionally re-divide the consolidated outgoing RU chain into a substitute outgoing RU chain with a more efficient maximum RU size.)

Queued Mapping Optimization of Outgoing SEND Data. At that point, UOV may queue the consolidated RU data (e.g., by queueing a pointer to the data) for mapping-type optimization, including input suppression, to generate a substitute outgoing data stream (as discussed in the patents cited in Section 1). In doing so, it takes several steps to handle possible "collisions" between incoming and outgoing data streams if the application APPL is "out of bracket" and the session is in "contention mode."

Contention mode and bracket state are two well-known aspects of SNA data communications. By sending a BEGIN BRACKET message in an outgoing data stream, an application APPL can in essence lock out incoming data from a logical unit LU until the APPL sends an END BRACKET message. (A logical unit LU can do essentially the same thing.) If the session is in contention mode and both the application APPL and the logical unit LU attempt to send data at the same time, a collision occurs and one or the other of the APPL or the LU "wins," depending on session parameters as documented in the VTAM Manual.

If the session is in contention mode, then UOV maintains a single-threaded SEND PEND queue of pending SEND requests. This queue is maintained to deal with a potential problem that can arise when the session is in contention mode and the application APPL is out of bracket. UOV keeps track of the bracket state, i.e., whether the application is in or out of bracket for the session in question (the problem in question does not occur when the application APPL is in-bracket). Whenever the session is in contention mode and the application is out of bracket, UOV creates a "pending" image and specifies in its own SEND macro instruction that the logical unit LU is to provide a definite success/no-success response to the SEND request. UOV performs mapping-type optimization based on the pending map, but keeps the original map until the definite response comes back from the logical unit LU. If the definite response is "success," then UOV discards the original map and substitutes the pending map as the new original map. If the session is returned to normal (noncontention) mode, UOV continues to process the queued SEND PEND requests until the queue is empty. If the definite response is "failure," then UOV discards the pending map and keeps the original map. If the application APPL had specified an exception response in its SEND macro instruction, the "success" response is discarded.

Dynamic Local Formatted Storage (LFS) or "Outboard Formatting". One novel aspect of the invention is its improved use of local formatted storage (LFS) or "outboard formatting." Local formatted storage is a feature available in some SNA terminals and other device-type logical units LU. Generally speaking, outboard formatting involves the downloading by an application APPL to a device-type LU, e.g., a controller for one or more terminals, of one or more "canned" formats such as a screen display, e.g., a blank airline terminal reservation form downloaded as a format to a travel agency terminal, which stores the format in a memory. To cause a blank reservation form to appear on the terminal screen, the application APPL need only send a comparatively short command (a structured field) directing the controller, in effect, to "display the blank reservation form." In response to that command, the controller retrieves the format from memory and displays it on the screen.

Downloading of formats presents something of a challenge. An early instance of outboard formatting was the IBM 8100 device, for which formats had to be handcarried. Another difficulty with the IBM 8100 was that application APPLs had to be modified to send a structured field instead of the entire screen. IBM later enhanced the SNA architecture to allow downloading of formats, but applications still had to be modified to send structured fields.

In a novel approach to local formatted storage, UOV dynamically "learns" what screen displays can be used as formats by comparing how the displays look over time and noting commonalities for possible use as local formats. UOV repeatedly refines its format definitions as necessary to distinguish variable data from fixed data, and periodically downloads or updates the downloaded format at the controller or other device. In one implementation, UOV does so by defining an additional logical unit LU designated as LOCADDR=1 (a standard designation for a particular controller hardware configuration) and taking the following steps in the course of performing mapping-type optimization of an outgoing data stream:

1. Generate a present-state map of the terminal display as taught in the above-referenced commonly assigned patents;
2. Create a copy of the present-state map for use as an intended-state map;
3. Perform image-alteration steps as taught in, e.g., U.S. Pat. No. 4,937,739;
4. Update the intended-state map to reflect the contents of the outgoing data stream;
5. Create a bit map of the bytes present in the terminal display (primary plane only, not extended-attribute plan), with bits turned on to correspond to each attribute byte, off for nonattribute bytes. This is a quick way of identifying a screen display and is believed to be a key advantage of this approach to local formatted storage;
6. Search a table of bit maps of existing formats for a match (an exact match, although inexact matches are also contemplated). Any convenient search algorithm such as binary search, serial search, or hash search may be used;
7. If a match is found in the existing-format bit maps, corresponding to a trial format, then perform a mapping-type comparison of the updated-state map with the matched format.

Three results are possible:

(a) If no mismatches at all are found, i.e., the updated-state map is identical to the trial format, then a PRESENT ABSOLUTE FORMAT order directing the controller to display the trial format may be sent in lieu of the outgoing data stream;

(b) If some mismatches exist between the updated-state map and the trial format, but at the points of mismatch the format has binary zeros, then a PRESENT ABSOLUTE FORMAT order directing the controller to display the trial format can be used in conjunction with an overwriting data stream to create the exact screen display desired. This may be combined with a "vote" whether it would be more efficient (e.g., result in a shorter outgoing data stream) to skip the use of the trial format and use straightforward mapping-type optimization instead;

(c) If some mismatches, exist between the updated-state map and the trial format, but at the points of mismatch the trial format has characters other than binary zeros, then refine the trial format by overwriting it with binary zeros at the points of mismatch. (This also helps keep confidential information off the screen prior to overwriting.) The refined trial format is downloaded to the controller to replace the previous version. This may be done asynchronously (i.e., complete the pending SEND transaction with conventional mapping-type optimization, then download a refined format later), or synchronously (i.e., suspend the SEND transaction until a refined format is downloaded, then proceed as in step (b) above). An advantage of performing this operation synchronously is that the same data are not sent to the controller twice. As in step (b), this may be combined with a "vote" whether it would be more effective (e.g., result in a shorter outgoing data stream) to skip the use of the trial format and use straightforward mapping-type optimization instead.

8. If no match is found, build a new format from the updated-state map and download it to the controller, and "vote" whether mapping-type optimization or format use would be more effective. In the former case, perform mapping-type optimization; in the latter case, overwrite the present-state image with the format, perform a mapping-type comparison with the (identical) update-state image, and proceed as in case 7(a). (If the terminal includes any extended-attribute plane, a supplemental data stream must be generated to set the extended attributes correctly.)

In downloading formats to the terminal, UOV uses a LOAD FORMAT command with a WRITE command (as opposed to an ERASE WRITE command) to avoid blinking on the terminal screen.

Bypass SEND and Receive (BSR) Processing

When BSR processing is in effect for two partner sessions (see Section 4.5), special handling is used for a SEND request issued by one partner session. As illustrated in FIG. 11, the SEND request is, in effect, converted to complete a RECEIVE request issued by the other partner session by:

(1) overwriting the appropriate fields in the request parameter list RPL originally created for the SEND request by the first partner session, as specified in the VTAM Manual;

(2) notifying the SENDing VTAM application that the SEND request has been completed;

(3) in the RPL for a pending RECEIVE request issued by the receiving application, overwriting the address of the buffer intended to receive data with the address of the buffer containing the SEND data from the sending application (thus effectively converting the SEND buffer of the sending partner session to a RECEIVE buffer for the receiving partner session); and (4) notifying the receiving partner session that one of its pending RECEIVE requests has been completed (e.g., by scheduling the execution of an exit routine specified in the RPL for the RECEIVE request), or queueing the data from the newly-converted SEND if the partner session does not have any RECEIVEs outstanding.

This results in significant savings of system resources (e.g., global savings of approximately ⅓ of CPU time in some host systems) over that which would have been required for VTAM to process the SEND and RECEIVE from the partner sessions.

RESETSR Processing

As documented in the VTAM Manual, a RESETSR request is a macro instruction for VTAM to cancel RECEIVE requests of specified type(s) (i.e., DFSYN, DFASY, and RESP types) for a session and to switch the session to CONTINUE ANY or CONTINUE SPEC mode. When a RESETSR request is issued by an APPL for a particular session, UOV edits the RECEIVE-queue entries for the session to reflect the cancellation of the specified type(s) of RECEIVE requests. Any queued RECEIVE all of whose type(s) were cancelled by the RESETSR request are removed from the queue entirely and a cancellation completion message is passed to the issuing APPL (i.e., the RECEIVE is completed by posting it as having been cancelled). The RESETSR request is completed and an appropriate message is sent to the terminal or other logical unit LU, in the conventional manner.

After cancelling the specified RECEIVE-request,type(s) in response to the RESETSR request, UOV commences its action for matching the queued RUs with pending RECEIVE ANY requests as described in Section 4.6, if that action is not already in progress. As usual, certain RECEIVE requests (of type DFASY or RESP) may result in the driving of an exit routine specified by the APPL in, e.g., the request parameter list RPL of a RECEIVE request (see Section 4.6(c)).

Merging of User Exit Queues

The process of expanding a chain of request/response units RU typically results in a bigger group of RUs. Thus, a one-to-one correspondence no longer between the number of RECEIVEs issued by the application APPL and the number of RECEIVEs issued by UOV to VTAM. Because of this, UOV (as opposed to VTAM) must drive the user exit queue (i.e., drive the user exit routines) for those RECEIVEs which require processing by a user exit routine.

The user exit queue for an application APPL is defined in VTAM such that only one exit is allowed to be driven at any given time. If UOV were to allow VTAM to drive some exits, and UOV to drive others, the possibility exists that two exits would be driven at one time, which would be a violation of the VTAM API.

To take this into account, UOV intercepts all potential user exit requests from VTAM and merges them with UOV-generated user exit requests such as extra RECEIVEs, LOGON requests for virtual sessions, and RESETSR completed RECEIVEs, and forms a single new user exit queue per task. As a result, the VTAM user exit queue is composed entirely of UOV exit routines, while UOV maintains its own user exit queue.

The driving of a user exit routine for an application APPL begins when VTAM drives the UOV exit. UOV copies the exit data to a control block EWA; it queues the exit and returns control to VTAM. In the process of queueing the exit UOV checks to see if the queue is running; if not, UOV passes control to the application APPL's user exit. UOV attempts to process the VTAM exit request quickly to return control back to VTAM quickly.

CLSDST Handling

An application APPL may generate a CLSDST macro instruction requesting that a session with a logical unit LU be terminated. UOV intercepts these requests for the reasons discussed above; it processes them in the same general (and well documented) manner as VTAM would, cleaning up and releasing control blocks, handling leftover request/response units RU, and the like.

The appendixes referred to above are set out below:

APPENDIXES

APPENDIX 1
(PRIOR ART)
VTAM REQUEST PROCESSING
(SIMPLIFIED)

| VTAM ACTIONS | | APPLICATION ACTIONS |
|---|---|---|
| | 1-10 | Write out control information to RPL for session in question ("leave message on message board") |
| | 1-20 | Write short work-to-be-done message, including VTAM request type and address of RPL containing additional control information |
| | 1-30 | Schedule execution of VTAM interface routine to signal VTAM that work-to-be-done message is waiting to be read |
| 1-40 Read work-to-be-done message, note type of action requested and address of APPL's RPL containing additional control information | | |
| 1-50 Read control information from APPL's RPL | | |
| 1-60 Execute request | | |
| 1-70 Write completion report to APPL's RPL | | |
| 1-80 Signal APPL that completion report is ready to be read | | |

APPENDIX 2
APPLICATION "OPEN" PROCESSING BY UOV

| VTAM ACTIONS | UOV ACTIONS | APPLICATION ACTIONS |
|---|---|---|
| | | 2-10 Create access method control block ACB (and optionally exit routine list EXLST) |
| | | 2-20 Issue OPEN macro instruction, including pointers to APPL's access method control block ACB and its exit routine list EXLST if any |
| | | 2-30 Schedule execution of OS routine to call VTAM's OPEN processor (not actually executed because of previously hooking by UOV) |
| | 2-40 Make copy of APPL's access method control block ACB (copy referred to as ACB_X) | |
| | 2-50 Build new exit list EXLST_X pointing to UOV exit routines | |
| | 2-60 Issue OPEN macro instruction, specifying address of new access method control block ACB_X and exit list EXLST_X | |
| | 2-70 Branch to VTAM's OPEN processor | |
| 2-80 Perform usual OPEN processing, including (i) updating usual fields of ACB_X, and (ii) writing address of VTAM interface routine to ACBINTRTN field of ACB_X | | |
| 2-90 Return control to UOV | | |
| | 2-100 Copy all ACB_X fields updated by VTAM to corresponding fields in ACB, except address of VTAM interface routine | |
| | 2-110 Write address of UOV interface routine to ACBINTRTN field of APPL's original ACB. | |
| | 2-120 Issue RECEIVE ANY for UOV-created ACB_X | |
| | 2-130 Return control to application APPL | |
| | | 2-140 Continue normal processing |

APPENDIX 3
SESSION ESTABLISHMENT BY UOV

| | VTAM ACTIONS | | UOV ACTIONS | | APPLICATION ACTIONS |
|---|---|---|---|---|---|
| 3-10 | Recieve session-establishment request from logical unit LU (e.g., end user operating a terminal) | | | | |
| 3-20 | Locate ACB_X (previously substituted by UOV for APPL's original ACB) | | | | |
| 3-30 | Get address of substitute/new exit list EXLST_X from ACB_X | | | | |
| 3-40 | Get address of UOV LOGON exit routine for handling session-establishment request from exit list EXLST_X | | | | |
| 3-50 | Schedule execution of UOV LOGON exit routine located in step 3-40 | | | | |
| | | 3-60 | Copy all relevant information concerning LOGON exit, build session control block SCBE | | |
| | | 3-70 | Return control to VTAM | | |
| | | 3-80 | Get address of APPL exit routine for handling session-establishment requests from EXLST | | |
| | | 3-90 | Schedule execution of APPL session-establishment exit routine located in step 3-80 | | |
| | | | | 3-100 | Perform usual session establishment tasks: build node initialization block NIB, etc. |
| | | | | 3-110 | Write RPL with control information for OPNDST macro instruction; write short message requesting execution of that macro instruction and noting address of RPL |
| | | | | 3-120 | Get address of "VTAM" interface routine (actually UOV interface routine) from field ACBINTRTN_X in access method control block ACB |
| | | | | 3-130 | Schedule execution of UOV interface routine to perform OPNDST macro instruction |
| | | 3-140 | Perform checks on OPNDST request similar to those performed by VTAM; reject selected incorrect requests detected by checks | | |
| | | 3-150 | Locate pending session control block SCBE, including information specified in node initialization block NIB built by application APPL | | |
| | | 3-160 | Build RPL, issue own OPNDST macro instruction to VTAM to establish session | | |
| 3-170 | Establish session, assign communications identifier CID to the session | | | | |
| 3-180 | Write message reporting completion of UOV's OPNDST macro instruction; schedule execution of UOV routine to handle completion report | | | | |
| | | 3-190 | Write address of UOV's session control block SCBE into CID field in appropriate fields of RPL and NIB | | |

-continued

| VTAM ACTION | | UOV ACTION | APPLICATION ACTION |
|---|---|---|---|
| | 3-200 | Write message reporting completion of APPL's OPNDST macro instruction; schedule execution of APPL's routine for handling completion report | |
| | 3-210 | | Continue normal APPL execution |

APPENDIX 4
SEND PROCESSING BY UOV

| VTAM ACTION | | UOV ACTION | | APPLICATION ACTION |
|---|---|---|---|---|
| | | | 4-10 | Build RPL, schedule request block RB to issue SEND macro instruction; execution of request block results in driving of UOV interface routine and not VTAM interface routine |
| | 4-20 | Queue a copy of SEND data piece specified in RU to UOV working buffer | | |
| | 4-30 | Is request unit RU a first-in-chain (FIC) or middle-in-chain (MIC)? Yes: (i) Write completion message indicating SEND macro instruction was completed satisfactorily, (ii) schedule request block to drive APPL's completion-notification, user exit as specified in RPL, NIB, etc., to allow APPL to continue operation. SEND RU chain is not yet complete; wait for APPL's next SEND request unit RU for specified session No: Continue | | (Continue operation)<br><br>(eventually issue one or more other SEND requests for session) |
| | 4-40 | If APPL's SEND RU is OIC or LIC, did APPL specify asynchronous execution (ASY)? Yes:<br>(i) schedule SRB request block to perform mapping-type data stream optimization on collected SEND data, to generate a substitute outgoing data stream (helps maximize CPU utilization in multiple-processor systems),<br>(ii) check to see if session is in contention mode; if so, create pending image and force definite response,<br>(iii) (a) queue a SEND request off the session control block SCBE;<br>(b) if APPL's SEND request specified POST =RESP notification of successful/unsuccessful completion, then specify that the SCBE-queued SEND request is PDST=SCHED instead | | |
| | 4-50 | Issue SEND requests to VTAM from SCBE queue<br>- FIFO order<br>- "authorized path" mode | | |
| 4-60 | Send data to appropriate logical unit LU (e.g., terminal) | | | |
| 4-70 | If definition response requested, receive response from logical unit LU and complete UOV-issued RECEIVE ANY with response | | | |
| | 4-80 | Complete APPL-issued SEND request with response | | |

|  |  |  |  |
|---|---|---|---|
| | 4-90 | Note any CONTINUE ANY/ CONTINUE SPECIFIC operand in session control block SCBE | |

APPENDIX 5
INCOMING DATA HANDLING BY UOV

| VTAM ACTIONS | | UOV ACTIONS | APPLICATION ACTIONS |
|---|---|---|---|
| 5-10 | Receive data stream from a logical unit LU (e.g., terminal). Store data stream contents temporarily in work buffer | | |
| 5-20 | Determine identity of [UOV] session for which data stream is intended | | |
| 5-30 | Determine whether [UOV] session is in CONTINUE ANY or CONTINUE SPEC mode [it always is] | | |
| 5-40 | Determine whether [UOV] session has any RECEIVE requests pending [it always does] | | |
| 5-50 | RECEIVEs pending?<br>No: Wait for RECEIVEs for session to be issued by UOV<br>Yes:<br>    Copy data to [UOV] session buffer<br>    CONTINUE ANY mode?<br>    Yes: [always]<br>        Complete the RECEIVE ANY | | |
| | 5-60 | Get SCBE address from RPL user field | |
| | 5-70 | Put FIC or MIC RUs into a temporary "not ready for completion" queue for the session; Consolidate a LIC with any previous FIC or MICs from the "not ready" queue | |
| | 5-80 | If chain of RUs complete, call mapping-type optimizer and expand from image as appropriate | |
| | 5-90 | Queue all (expanded) LIC or OIC data, reblocked as necessary, to a "ready for completion" queue | |
| | 5-100 | Attempt to match each RU in the "ready" queue to a pending RECEIVE | |
| | 5-110 | Get CONTINUE ANY|SPEC status from SCBE | |
| | 5-120 | Attempt to match data for CONTINUE SPEC session (if in that mode) with any RECEIVE SPECs queued to that session's SCBE | |
| | 5-130 | Queue unmatched data to SCBE | |
| | 5-140 | Attempt to match data for CONTINUE ANY session with (i) any RECEIVE SPECs queued to that session's SCBE, followed by (ii) any RECEIVE ANYs queued to the APPL's control block VDB<br>Queue unmatched data to both VDB and SCBE, proceed in same general manner as steps 5-70 through 5-100 | |

-continued

APPENDIX 6
APPLICATION "RECEIVE" PROCESSING BY UOV

| VTAM ACTIONS | | UOV ACTIONS | | APPLICATION ACTIONS |
|---|---|---|---|---|
| | | | 6-10 | Write request parameter list RPL for RECEIVE request Schedule execution of "VTAM" (actually UOV) interface routine |
| | 6-20 | Determine session identity from communications identification code CID (actually SCBE address) in RPL | | |
| | 6-30 | If RECEIVE SPEC request, attempt to match with incoming data previously queued to SCBE (step 5-120) If RECEIVE ANY request, attempt to match with incoming data previously queued to VDB (step 5-140) | | |
| | 6-40 | ? Data found to match RECEIVE request? | | |
| | Yes: | Write completion message to RPL for RECEIVE request Complete the RECEIVE as specified by the APPL | | |
| | No: | Queue RECEIVE SPEC to SCBE (see step 5-120) Queue RECEIVE ANY to VDB (see step 5-140) | | |

What is claimed is:

1. A Bypass Send and Receive method, executed by a machine which is also executing (1) a communications program VTAM, (2) a first application program, and (3) a second application program, for converting an outgoing data stream from the first application program to an incoming data stream for the second application program, said Bypass Send and Receive method comprising:

(a) receiving a SEND request from the first application program, said SEND request having a data portion representing an outgoing data stream;

(b) receiving a RECEIVE request from the second application program, said RECEIVE request having a request-parameter-list portion;

(c) storing the SEND request's data portion in a buffer memory, said buffer memory having an address;

(d) notifying the first application program that the SEND request is completed;

(e) converting the outgoing data stream to an incoming data stream by modifying the RECEIVE request's request-parameter-list portion to include the address of the buffer memory; and (f) notifying the second application program that the RECEIVE request is completed.

2. The Bypass Send and Receive method of claim 1, wherein one of said first and second application programs is a logical unit engaged in a communications session with the other of said first and second application programs.

3. A program storage device readable by a machine and encoding a program of instructions for performing a Bypass Send and Receive method in accordance with claim 1 or claim 2.

* * * * *

UNITED STATES PATENT AND TRADEMARK OFFICE
CERTIFICATE OF CORRECTION

PATENT NO. : 5,892,907

DATED : April 6, 1999

INVENTOR(S) : Thomas A. Harper

It is certified that error appears in the above-identified patent and that said Letters Patent is hereby corrected as shown below:

On the cover page, please change the inventorship to indicate only one inventor:

At the top, under United States Patent [19], please delete "et al."

At [75] Inventors: Please delete as inventors Valdemar Garza, Jr., Houston, Tex. and Philip R. Mead, Los Angeles, Calif., leaving only: --Thomas A. Harper, Sugar Land, Tex.--

Signed and Sealed this

Eleventh Day of April, 2000

Attest:

Q. TODD DICKINSON

Attesting Officer

Director of Patents and Trademarks